United States Patent [19]
Melen

[11] Patent Number: 5,650,799
[45] Date of Patent: Jul. 22, 1997

[54] PROGRAMMABLE FUNCTION KEYS FOR A NETWORKED IMAGING COMPUTER SYSTEM

[75] Inventor: Roger D. Melen, Los Altos Hills, Calif.

[73] Assignee: Canon Kabushiki Kaisha, Tokyo, Japan

[21] Appl. No.: 228,419

[22] Filed: Apr. 15, 1994

[51] Int. Cl.$^6$ .................................................... G09G 3/02
[52] U.S. Cl. ........................ 345/172; 358/468; 379/93.17
[58] Field of Search .................................. 345/168, 173, 345/156, 172, 1; 379/96; 358/468, 400, 434, 438, 440, 442; 395/155

[56] References Cited

U.S. PATENT DOCUMENTS

| | | | |
|---|---|---|---|
| 4,975,896 | 12/1990 | D'Agosto, III et al. | 379/96 |
| 5,001,710 | 3/1991 | Gawrya et al. | 379/96 |
| 5,008,853 | 4/1991 | Bly et al. | 345/2 |
| 5,008,948 | 4/1991 | Tsukawaki | 382/13 |
| 5,163,085 | 11/1992 | Sweet et al. | 379/75 |
| 5,347,628 | 9/1994 | Brewer et al. | 395/159 |

OTHER PUBLICATIONS

The Norton pc Anywhere, User's Guide, 1991, pages ii, v, vi, 16–17, 20–35, 173, and 291–292.

R.L. Corey, "Automated Filmless Artillery Fuze Inspection", Vision '85 Conference Proceedings, Mar. 25–28, 1985, pp. 6–8 to 6–20.

M. Bina, et al., "Pattern Recognition Machine: Its Conception and Creation", Microprocessing and Microprogramming, vol. 19, No. 4, Oct. 1987, pp. 327–333.

"Anatomy of a Versatile Page Reader", Henry S. Baird, Proceedings of the IEEE, vol. 80, No. 7, Jul. 1992.

"Global–to–Local Layout Analysis", Henry S. Baird, Structural Pattern Analysis, 1989, pp. 181–196.

"A Rule–Based System For Document Image Segmentation", James L. Fisher, et al., IEEE, May 1990, pp. 567–572.

"A Document Skew Detection Method Using Run–Length Encoding And The Hough Transform", Stuart C. Hinds, et al., IEEE, May 1990, pp. 464–468.

"Logical Structure Descriptions of Segmented Document Images", James L. Fisher, pp. 302–310.

"Connected Component Labeling Using Quadtrees", Hanan Samet, Journal of the Association for Computing Machinery, vol. 28, No. 3, Jul. 1981, pp. 487–501.

"Segmentation of Grey Scale Sampled Images With Bimodal Source Models", Sally L. Wood, et al., 26th Asilomar Conference on Signals and Computers, IEEE 1992, vol. 1, pp. 456–460.

"Blind Adaptive Image Binarization For A Practically Infinite Accuracy In Typewritten Character Recognition", Hamadi Jamali, et al., Synopsis of Oral Presentation, SPIE Visual Communications and Image Processing '93, Nov. 8–11, 1993.

*Primary Examiner*—Kee M. Tung
*Assistant Examiner*—Doon Chow
*Attorney, Agent, or Firm*—Fitzpatrick, Cella, Harper & Scinto

[57] ABSTRACT

A personal imaging computer system (PICS) is connected to a local area network (LAN) and includes a plurality of programmable function keys which can be programmed over the LAN by remote LAN users from their workstations. Once programmed, manipulation of the function keys causes the PICS equipment to perform at least one of plural selectable image-processing tasks. Preferably, the programmable function keys are divided into two groups, one of the groups being restricted to programming by the network administrator only, and the other group having unrestricted programming by any LAN user. The PICS equipment includes a display which displays an image of the plural function keys, and in response to operator selection on the display of a displayed image of one of those plural function keys, the function performed by that key is also displayed. When the physical function key itself is manipulated, the PICS equipment executes the programmed imaging-processing tasks.

14 Claims, 30 Drawing Sheets

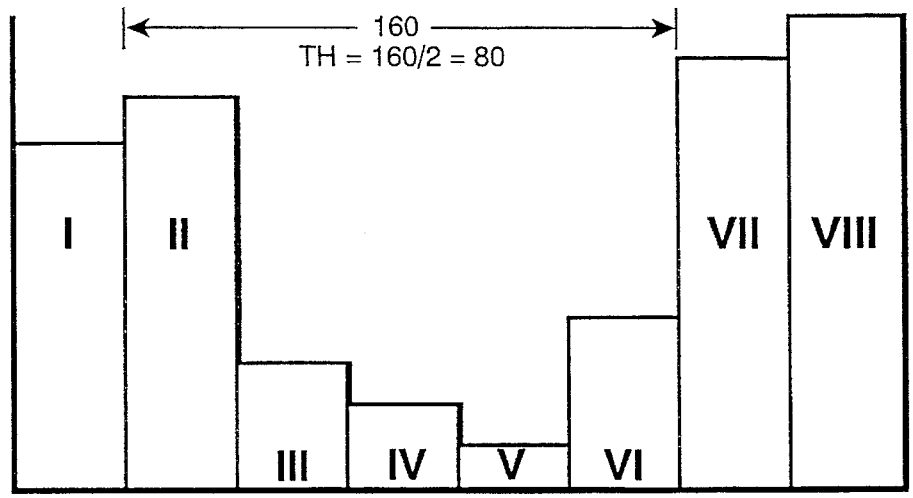
FIG. 13(a)
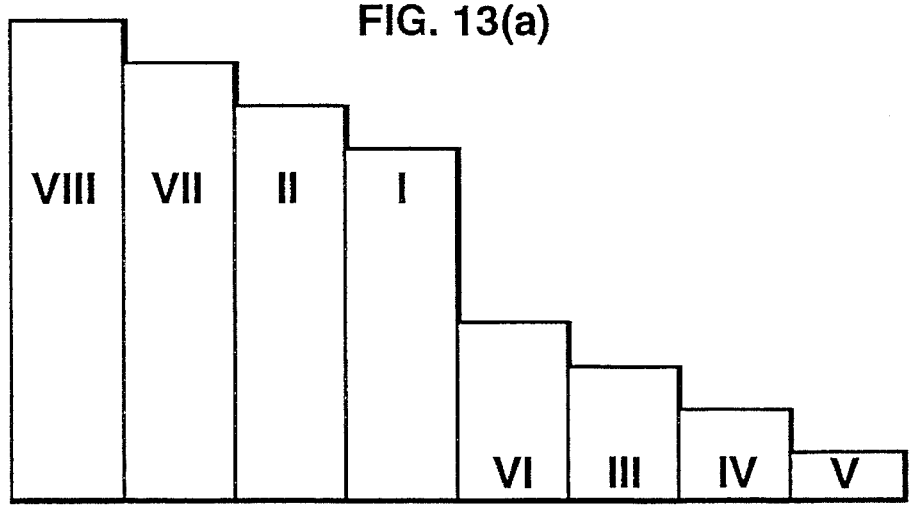
FIG. 13(b)
| CONNECTED COMPONENT |
|---|
| IMAGE |
| LOCATION |
| ATTRIBUTES: |
| ASPECT RATIO |
| PIXEL COUNT |
| DENSITY |
| PERIMETER |
| PERIMETER/WIDTH RATIO |
| (PERIMETER)²/AREA RATIO |
| TYPE (I.E. "TEXT", "NON-TEXT" OR "UNKNOWN") |
FIG. 16

PROGRAMMABLE FUNCTION KEYS FOR A NETWORKED IMAGING COMPUTER SYSTEM

BACKGROUND OF THE INVENTION

1. Field of the Invention

The present invention relates to an optical character recognition system, and more particularly to methods and apparatuses for scanning and storing images of documents in a computer, for segmenting images of the document into text and non-text blocks, and for determining the identity of characters in the text blocks.

2. Description of the Related Art

In recent years, it has become possible to scan in paper copies of documents so as to form computerized images of such documents, and to analyze images in text areas of the document so as to recognize individual characters in the text data and to form a computer readable file of character codes corresponding to the recognized characters. Such files can then be manipulated in word-processing, data-compression, or other information processing programs, and can also be used to retrieve the images of the documents in response to a query-based search of the text data. Such systems, which are hereinafter referred to as "character recognition systems", are advantageous because they eliminate the need to re-type or otherwise re-enter text data from the paper copies of the documents. For example, it is possible to recognition-process a document which has been transmitted by facsimile or reproduced from microfilm or by a photocopier so as to form computer text files that contain character codes (for example, ASCII character codes) of the characters and the numerals in the document.

Conventional character recognition systems scan the paper copy of the document to form a binary image of the document. "Binary image" means that each pixel in the image is either a binary zero, representing a white area of the document or, a binary one, representing a black area. The binary image (or "black-and-white image") is thereafter subjected to recognition processing so as to determine the identity of characters in text areas of the document.

It has recently been discovered that recognition accuracy can be improved dramatically if the paper document is scanned to form a gray-scale image of the document. "Gray-scale" means that each pixel of the document is not represented by either a binary one or a binary zero, but rather is represented by any one of more than two intensity levels, such as any one of four intensity levels or 16 intensity levels or 256 intensity levels. Such a system is described in commonly-assigned application Ser. No. 08/112,133 filed Aug. 26, 1993, "OCR Classification Based On Transition Ground Data", the contents of which are incorporated herein by reference as if set forth in full. In some cases, using gray-scale images of documents rather than binary images improves recognition accuracy from one error per document page to less than one error per 500 document pages.

FIG. 1 illustrates the difference between binary images and gray-scale images, and assists in understanding how the improvement in recognition accuracy, mentioned above, is obtained. FIG. 1(a) illustrates a character "a" over which is superimposed a grid 1 representing the pixel resolution with which the character "a" is scanned by a photosensitive device such as a CCD array. For example, grid 1 may represent a 400 dot-per-inch (dpi) resolution. A binary image of character "a" is formed, as shown in FIG. 1(b), by assigning to each pixel a binary one or a binary zero in dependence on whether the character "a" darkens the photosensitive device for the pixel sufficiently to activate that pixel. Thus, pixel 2a in FIG. 1(a) is completely within a black portion of character "a" and results in black pixel 2b in FIG. 1(b). On the other hand, pixel 3a is completely uncovered and results in white pixel 3b. Pixel 4a is partially covered but insufficiently covered to activate that pixel and therefore results in white pixel 4b. On the other hand, pixel 5a is covered sufficiently so as to activate it and results in black pixel 5b.

FIG. 1(c) shows a gray-scale image of the same character "a". As shown in FIG. 1(c), pixels which are completely covered (2a) or uncovered (3a) result in completely black or white gray-scale levels, the same as in FIG. 1(b). On the other hand, pixels which are partially covered are assigned a gray level representing the amount of coverage. Thus, in FIG. 1(c) which shows a four-level gray-scale image, pixel 4c receives a low gray-scale value and pixel 5c receives a higher gray-scale value due to the relative coverage of pixels 4a and 5a, respectively. Thus, because of an artifact of the scanning process, an original black and white document, as shown in FIG. 1(a), can be scanned into a gray-scale image as shown in FIG. 1(c) with gray-scale values being assigned primarily at character edges and being dependent on coverage of the pixels.

A comparison of FIGS. 1(b) and 1(c) shows that there are additional details in FIG. 1(c), especially at character edges. This additional detail is primarily responsible for improved recognition accuracy.

A problem still remains, however, in how to extract individual gray-scale images of characters from a gray-scale image of a document so as to send the individual gray-scale character image for recognition processing. More particularly, recognition accuracy depends greatly on the ability to determine where one character begins and another ends so that only a single character, rather than a group of characters, is subjected to recognition processing.

FIG. 2 illustrates this situation and shows a page of a representative document. In FIG. 2, a document 10 is arranged in two-column format. The document includes title blocks 12 which include text information of large font size suitable for titles, a picture block 13 which includes a color or halftone picture, text blocks 14 which include lines of individual characters of text information, a graphic block 15 which includes graphic images which are non-text, a table block 16 which includes tables of text or numerical information surrounded by non-text borders or frames, and caption blocks 17 which include text information of small font size suitable for captions and which are normally associated with blocks of graphic or tabular information.

When document 10 is scanned to form a gray-scale image of the document, prior to recognition processing, it is necessary to determine which areas of the gray-scale image are text areas and which are non-text areas, and also to determine, for the text areas, where individual characters are located. This processing is hereinafter referred to as "segmentation processing". Only after segmentation processing has located individual characters can the images of those characters be subjected to recognition processing so as to identify the characters and to form a text file of the characters.

Conventional segmentation processing techniques for binary images are generally unsatisfactory in that they do not accurately separate text from non-text areas and they do not accurately identify the location of individual characters in the text areas. Moreover, for gray-scale images, no segmentation processing techniques are currently known.

Furthermore, the variety of available image processing techniques is increasing and it is becoming increasingly typical for a user to chain different image processing tasks together so as to achieve a desired output. For example, to build a searchable database of image files, a user may need to scan in some documents to create some image files, retrieve some other image files from an existing database, subject all image files to recognition-processing to create text files, and store the text files in association with the image files. However, as the variety of image processing tasks increases, it is rapidly becoming more difficult for the user to chain those tasks together. This is especially true when the user is operating on a computerized local area network and the image processing center is physically remote from where the user is located, since the user must remember the image processing tasks as he walks from his location to that of the image processing center.

SUMMARY OF THE INVENTION

It is an object of the present invention to provide an improved gray-scale character recognition system that is operable on a computerized local area network and which includes a plurality of programmable function keys which allow users to specify in advance which image processing tasks are needed.

According to this aspect of the invention, a personal imaging computer system includes imaging computer means connectable to a local area network (LAN), the imaging computer means for performing selectable image-processing tasks on document images. The system includes plural programmable function keys which may be programmed by network users from their individual workstations and which can be selected by the network user when they physically arrive at the system to perform image processing tasks. If desired, the plural programmable function keys may be divided into two groups, one of the groups being programmable only by a network administrator, and the other of the groups being programmable by any LAN user. Display means are provided for displaying an image of the plural function keys. In response to operator selection of an image of one of the plural function keys, the display means displays the function performed by that key, and in response to operator manipulation of the physical function key, the personal imaging computer system performs the image processing task programmed by that key.

According to further aspects of the invention, individual characters in a gray-scale image of a document are extracted for recognition processing by thresholding the gray-scale image to obtain a binary image, segmentation-processing the binary image to locate individual characters within the binary image and to determine the shape of the individual characters, and using the location and shape of the binary image to extract the gray-scale image of each individual character from the gray-scale image. The extracted gray-scale image of each character is then subjected to recognition processing.

Thus, a character recognition system according to the invention identifies characters in a document on which the characters are formed by scanning the document to obtain a gray-scale image of the document, and by generating a binary image from the gray-scale image by comparing the gray-scale image with a threshold. The binary image is segmented to locate individual characters within the binary image and to determine the shape of the individual characters. Based on the location and the shape of the character in the binary image, gray-scale image information is extracted from the gray-scale image for each such individual character. The extracted gray-scale image is then recognition-processed to determine the identity of the character, and the identity of the character is stored in a computer-readable file.

Improved recognition accuracy can also be obtained by not only recognition-processing the gray-scale image of the character, as described above, but by additionally recognition-processing the binary image of the character. Any inconsistencies between identities determined from the gray-scale image and the binary image are resolved (or "disambiguated") based on physical image attributes, such as aspect ratio and pixel density, of the binary image of the character.

Additional recognition accuracy can be obtained by determining font characteristics of the characters, for example, by determining whether the characters are uniformly spaced, proportionally spaced, sans-serif, or the like. Based on the font characteristics, one of plural recognition processing techniques is selected, and as each character is extracted, as described above, the extracted character is subjected to recognition processing in accordance with the selected recognition processing technique.

Once text within a document has been identified and stored as a computer readable file, that text file may be used to retrieve the document image, for example, using a query-based search so as to retrieve a corresponding document image.

Because recognition processing techniques require a resolution for the document image that is much higher than required for normal human visual acuity, one aspect of the invention is directed to a document storage and retrieval system which, when compared to conventional systems, reduces the amount of storage that is needed. According to this aspect of the invention, a document storage and retrieval system involves scanning a document at a first resolution to form a gray-scale image of the document, the first resolution being suitable for recognition-processing text in the document. Text in the document is recognition-processed so as to obtain a computer-readable file of the text, and the resolution of the gray-scale image is then reduced to a second resolution lower than the first resolution, the second resolution being suitable for visual perception and reproduction of the image. Only the reduced resolution image is stored, and it is stored in association with the computer readable file so that the image may later be retrieved using a query-based search.

By virtue of this arrangement, since a lowered resolution image is stored, memory storage requirements are reduced and more images can be stored. Moreover, processing speed is increased since the amount of image data is smaller and it can be moved, compressed and decompressed, and otherwise processed, more quickly.

This brief summary has been provided so that the nature of the invention may be understood quickly. A more complete understanding of the invention can be obtained by reference to the following detailed description of the preferred embodiment thereof in connection with the attached drawings.

BRIEF DESCRIPTION OF THE DRAWINGS

FIGS. 13(a) and 13(b) are representative histograms of a gray-scale image.

FIG. 16 shows image attributes stored for each connected component.

FIG. 22, which includes

DETAILED DESCRIPTION OF THE PREFERRED EMBODIMENT

Figure 3:
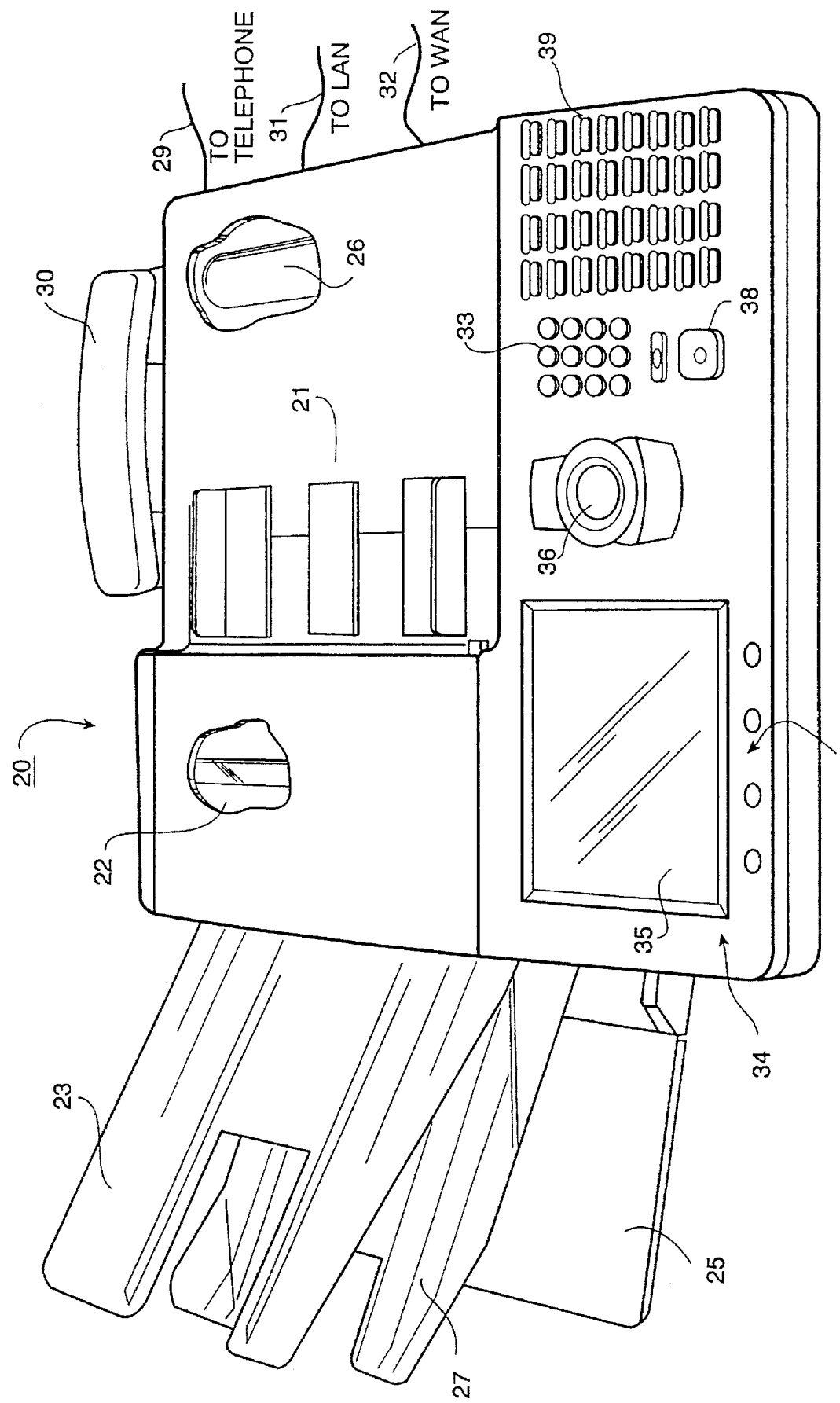
FIG. 3 is a partially cut-away view of the outward appearance of a personal imaging computer system according to the invention.
Figure 4:
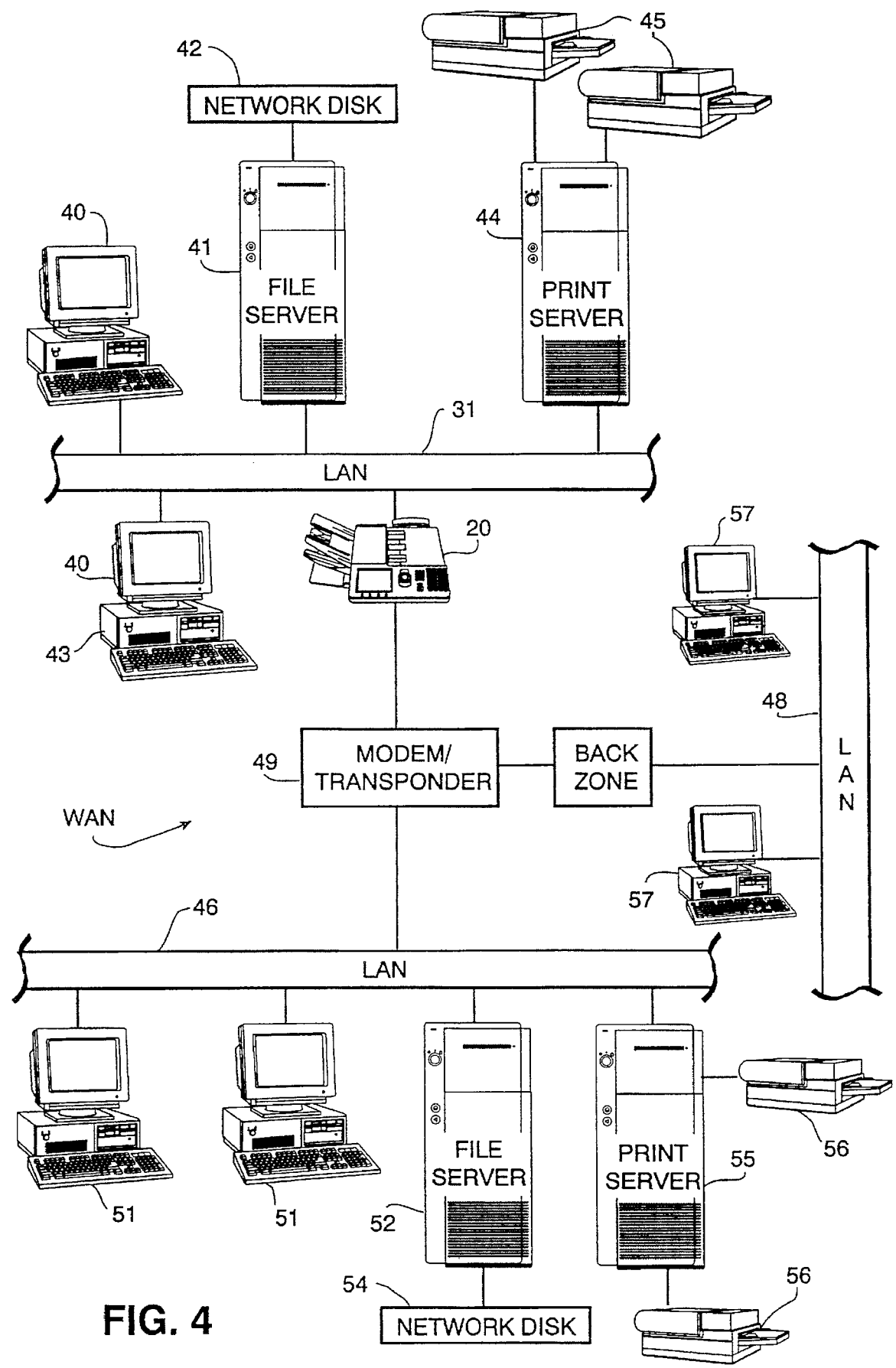
FIG. 4 is a diagram explaining network connection of the FIG. 3 apparatus.
Figure 5:
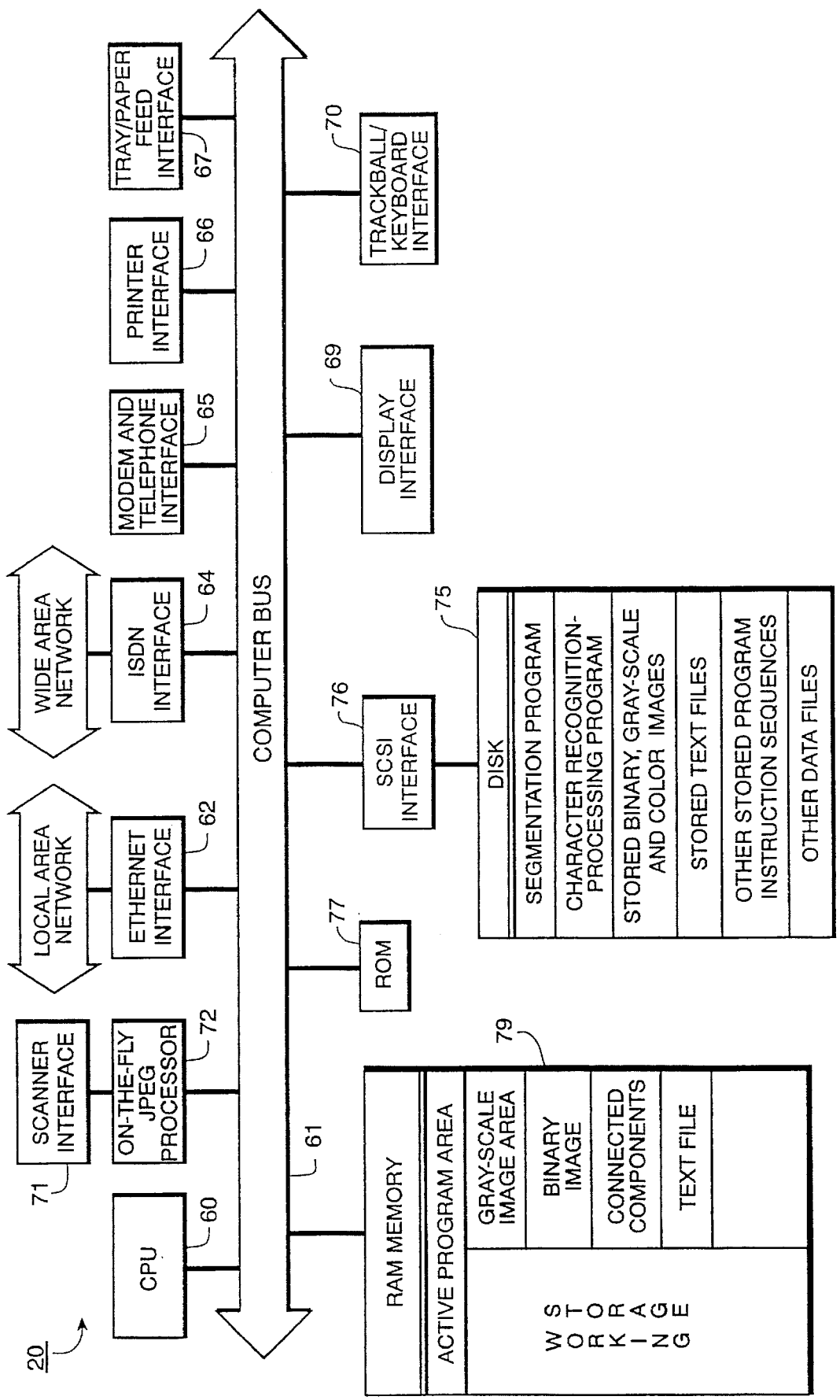
FIG. 5 is a detailed block diagram of the internal construction of the FIG. 3 apparatus.

The structure of one representative embodiment of the invention is shown in FIGS. 3, 4 and 5, and the operation of the representative embodiment is explained in the remaining figures. The embodiment described here is a "personal imaging computer system", that is, a single stand-alone device that contains document scanning, storage and processing equipment which is connectable to a computerized local area network or wide area network. Equivalent general purpose components may be substituted for the equipment described herein. It is possible, for example, to substitute a general purpose programmable computer with suitable peripheral equipment.

[1.1 Personal Imaging Computer System]

FIG. 3 is a partially cut away perspective view of the outward appearance of a personal imaging computer system ("PICS") that incorporates a gray-scale character recognition system according to the invention. As shown in FIG. 3, PICS equipment 20 includes, in one housing, a document feed section 21 upon which a stack of paper documents may be placed and from which the paper documents are fed one sheet at a time through a document scanner section 22. The document scanner section 22, which preferably includes a dual-side scanner, scans each document page using a CCD line-array to create a gray-scale image of the document. After scanning, the document pages are ejected to eject tray 23 upon which they are stacked. Blank document sheets in paper storage tray 25 (or in an unshown paper cartridge) are also fed by PICS equipment 20 past printer section 26 which forms toner images on the blank sheets and feeds the newly-printed documents to eject tray 27.

PICS equipment 20 further includes a facsimile/modem interface (shown in FIG. 5) by which PICS equipment 20 interfaces to an ordinary voice/data telephone line so as to engage in data and facsimile communication with remote computers and so as to permit an operator to engage in ordinary voice communication via telephone handset 30. Interfaces are also provided to a local area network 31 and a wide area network 32 so as to allow communication with users on remote workstations via such networks.

Operator controls and displays are provided at control panel 34. Control panel 34 includes a flat panel display screen 35 such as a VGA liquid crystal display panel. A trackball 36 is provided so as to permit an operator to manipulate a cursor displayed on display screen 35 and so as to permit an operator to select objects on the display screen. An ordinary telephone keypad is provided at 33, conventional facsimile control buttons are provided at 37, and start/stop buttons are provided at 38. Programmable function keys are provided at 39 so as to permit an operator to control various image processing operations of PICS equipment 20.

PICS equipment 20 includes a general purpose computer (described in further detail in FIG. 5) whereby an operator is able to scan in documents, segmentation-process and recognition-process the documents to create text files corresponding to text areas in the documents, print out document images, manipulate document images and text files via trackball 36 and display screen 35, and send and receive documents and images via facsimile. Other information processing techniques, such as word-processing, image-processing and spreadsheet-processing may be carried out by the operator in accordance with software loaded into PICS equipment 20, thereby providing the operator with a powerful personal imaging computer system together with a general purpose computer system for other information processing projects.

[1.2 Computerized Network Connection]

When connected to a local area network 31 and/or a wide area network 32, PICS equipment 20 provides the capabilities described above to computerized network users. More particularly, as shown in FIG. 4, PICS equipments 20 may be connected to a local area network 31. Plural workstations, such as workstations 40, are also connected to local area network 31, and under control of the network operating system, the workstations 40 are able to access the imaging capabilities of PICS equipment 20. One of the workstations, such as workstation 43, may be designated for use by a network administrator. Also connected to local area network 31 is a file server 41 which manages access to files stored on network disk 42. A print server 44 provides print services to printers 45. Other unshown peripherals may be connected to local area network 31. By virtue of this arrangement, operators at one of the workstations 40 can scan in a document using PICS equipment 20, segmentation-process and recognition-process the document image so as to obtain a text file corresponding to text areas of the document, store the document image and associated text file on network disk 42, retrieve the document image and its associated text file for manipulation, if desired, at workstation 40, and print out the original or manipulated document image and text file on one of printers 45.

Typically, a local area network such as that illustrated at 31 services a fairly localized group of users such as a group of users at one floor or contiguous floors in a building. As users become more remote from each other, for example, in different buildings or different states, a wide area network may be created which is essentially a collection of several local area networks all connected by high speed digital lines such as high speed ISDN telephone lines. Thus, as shown in FIG. 4, local area networks 31, 46 and 48 are connected to form a wide area network via modem/transponder 49 and backbone 50. Each local area network includes its own workstations, and each ordinarily includes its own file server and print server although that is not necessarily the case. Thus, as shown in FIG. 4, local area network 46 includes workstations 51, file server 52, network disk 54, print server 55, and printers 56. Local area network 48, on the other hand, includes only workstations 57. Via wide area network connections, equipment in any of local area networks 31, 46 or 48 can access the capabilities of equipment in any of the other local area networks. Thus, for example, it is possible for one of workstations 57 to access the imaging capabilities of PICS equipment 20 via backbone 50 and modem transponder 49; likewise, it is possible for one of workstations 51 to retrieve a document image from network disk 42, subject it to segmentation and recognition processing on PICS equipment 20, receive and manipulate the results at workstation 51, and print out documentation on one of printers 56. Other combinations are, of course, possible and the above examples should not be considered limiting.

[1.3 Internal Construction]

FIG. 5 is a detailed block diagram showing the internal construction and connections of the presently preferred embodiment of PICS equipment 20 in accordance with the invention. As shown in FIG. 5, PICS equipment 20 includes central processing unit ("CPU") 60 such an Intel 80486DX or reduced instruction set computer ("RISC") interfaced to computer bus 61. Also interlaced to computer bus 61 is Ethernet interface 62 for interfacing to local area network 31, ISDN interface 64 for interfacing to wide area network 32, modem/facsimile/voice telephone interface 65 for providing appropriate modem/facsimile/voice telephone interface to telephone line 29, printer interface 66 for interfacing to printer 26, and tray/paper feed interface 67 for providing appropriate paper feeding commands for feeding out of document tray 21 past scanner 22 and to eject tray 23, and for feeding out of paper supply 25 past printer 26 and to eject tray 27.

A display interface 69 interfaces between display 35 and computer bus 61, and a trackball/keyboard interface 70 provides interface between computer bus 61 and trackball 36 and keys 39.

Computer bus 61 interfaces to scanner 22 via scanner interface 71 and an on-the-fly JPEG ("Joint Photographic Expert Group") processor 72. More particularly, as scanner 22 scans a document and the pixel data is collected by scanner interface 71, scanner interface 71 sends the pixel data to JPEG processor 72 so that the pixel data is compressed using JPEG compression. The compressed pixel data is provided to computer bus 61 thereby speeding operation of the device by providing on-the-fly JPEG compression as a document is being scanned.

It is preferred for compression processor 72 to perform JPEG compression since JPEG compression is well known and can readily be used in the practice of the invention. However, other types of compression are also suitable, although lossy compression like JPEG is preferable.

In addition, JPEG processor 72 can be configured, via commands on bus 61, to decompress JPEG-compressed files into bit-map pixel data. The decompressed bit-map pixel data is then supplied through an unshown direct connection to print interface 66. If print station 26 is not able to print gray-scale pixels directly, then a software-settable threshold comparator may be provided in the direct connection so as to permit conversion of gray-scale pixel data into binary pixel data at any selectable threshold level. By virtue of this arrangement, JPEG-compressed image files can be printed quickly and without the need for software decompression by reading the file out through JPEG processor 72 and thence directly to print interface 66, with binary thresholding, if desired.

Disk 75, such as a 1.2 gigabyte hard disk, interfaces to computer bus 71 via SCSI ("Small Computer Systems Interface") interface 76. On the disk are stored both data files such as binary, gray-scale and color image data files, and text data files, as well as stored program instruction sequences by which CPU 60 manipulates and creates those data files. In particular, disk 75 includes stored program instruction sequences which segmentation-process gray-scale images of documents so as to distinguish between text and non-text regions of the document image and so as to extract individual characters from the text regions, and stored program instruction sequences which recognition-process images of characters so as to determine the identity of the characters. Suitable recognition processing techniques include, without limitation, feature and/or stroke extraction systems which extract feature and/or stroke information from character images for comparison to dictionaries of such information, neural network recognition systems which mimic human neural interconnectivity so as to identify character images, and hybrid systems which contain aspects of both feature/stroke recognition systems and neural network recognition systems.

Read only memory ("ROM") 77 interfaces with computer bus 61 so as to provide CPU 60 with specialized and invariant functions such as start up programs or BIOS programs. Main random access memory ("RAM") 79 provides CPU 60 with memory storage both for data and for instruction sequences, as required. In particular, when executing stored program instruction sequences such as segmentation programs or character recognition programs, CPU 60 normally loads those instruction sequences from disk 75 (or, in the case of network access, from other program storage media) to RAM 79 and executes those stored program instruction sequences out of RAM. Working storage areas for data manipulation are also provided in RAM and, as shown in FIG. 5, include working storage areas for gray-scale images, binary images, connected components and text files.

[2.0 Operation]

Operation of the above-described representative embodiment of the invention will now be described in connection with remaining FIGS. 6 through 22. In general, in accordance with operator instructions—which are usually received via keyboard/trackball interface 70 but which also may be received from other sources such as via the local area network 31 or wide area network 32 or via telephone line 29 by modem or DTMF commands—stored application programs are selected and activated so as to permit processing and manipulation of data. For example, any of a variety of application programs such as segmentation processing programs, recognition processing programs, word processing programs, image editing programs, spreadsheet programs and similar information processing programs, may be provided for operator selection and use. Thus, a segmentation processing program may be activated whereby a document is scanned by scanner 22 and a gray-scale image of the document stored in RAM 79. The gray-scale image is then segmentation-processed according to the stored program instructions, whereby text and non-text regions of the document are identified and individual characters from text regions are extracted. Thereafter, recognition processing programs may be activated which recognition-process the extracted character images to identify the characters and to store them to a text file. The resulting text file may then be presented to the operator for review and/or manipulation with other application programs such as word processing programs, or may be stored to disk or over local area network 31, wide area network 32, or telephone line 29.

[2.1 Programmable Function Keys]

Figure 6:
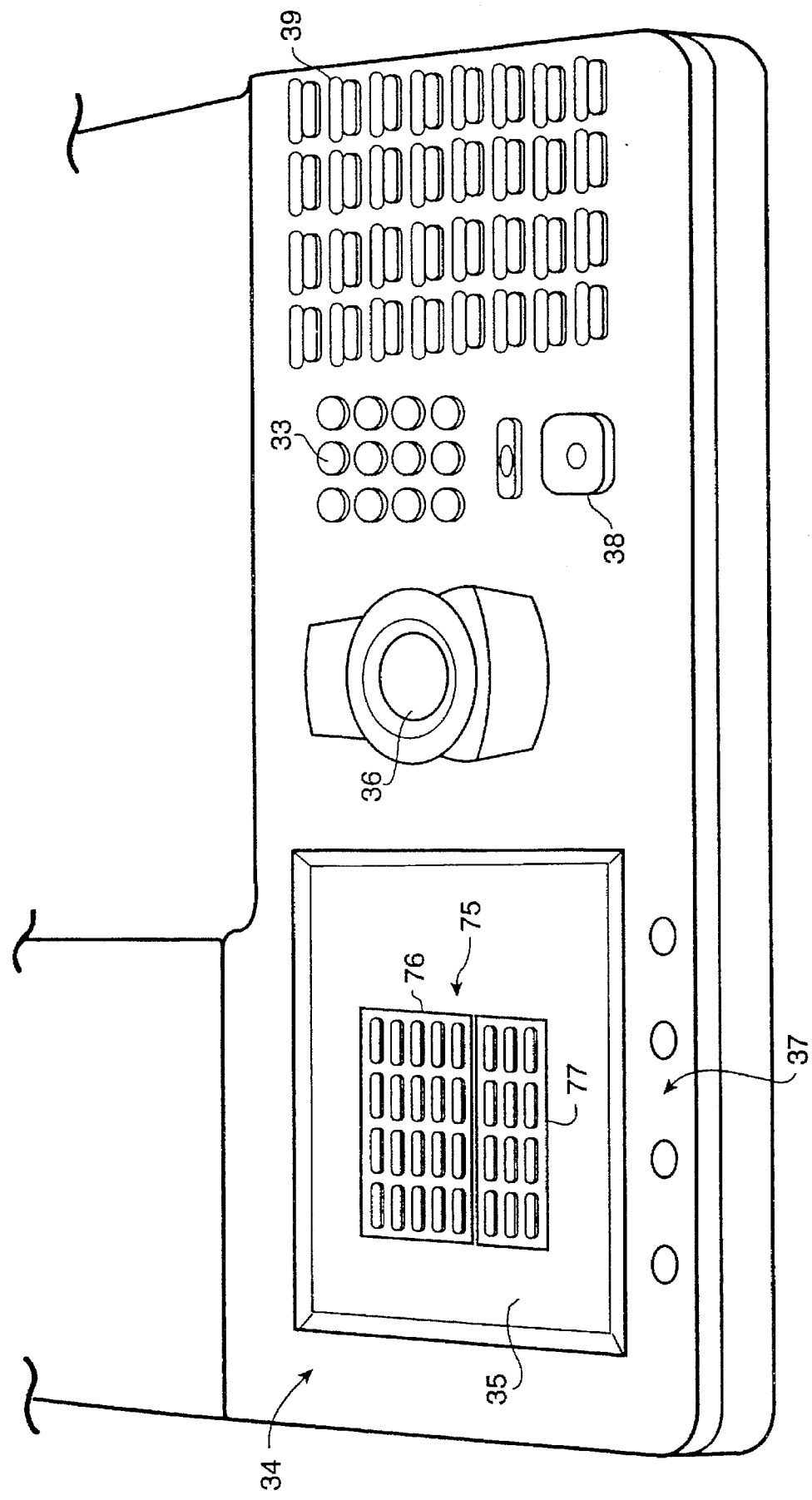
FIGS. 6 and 7 are close-up views of the control panel of the FIG. 3 apparatus.
Figure 7:
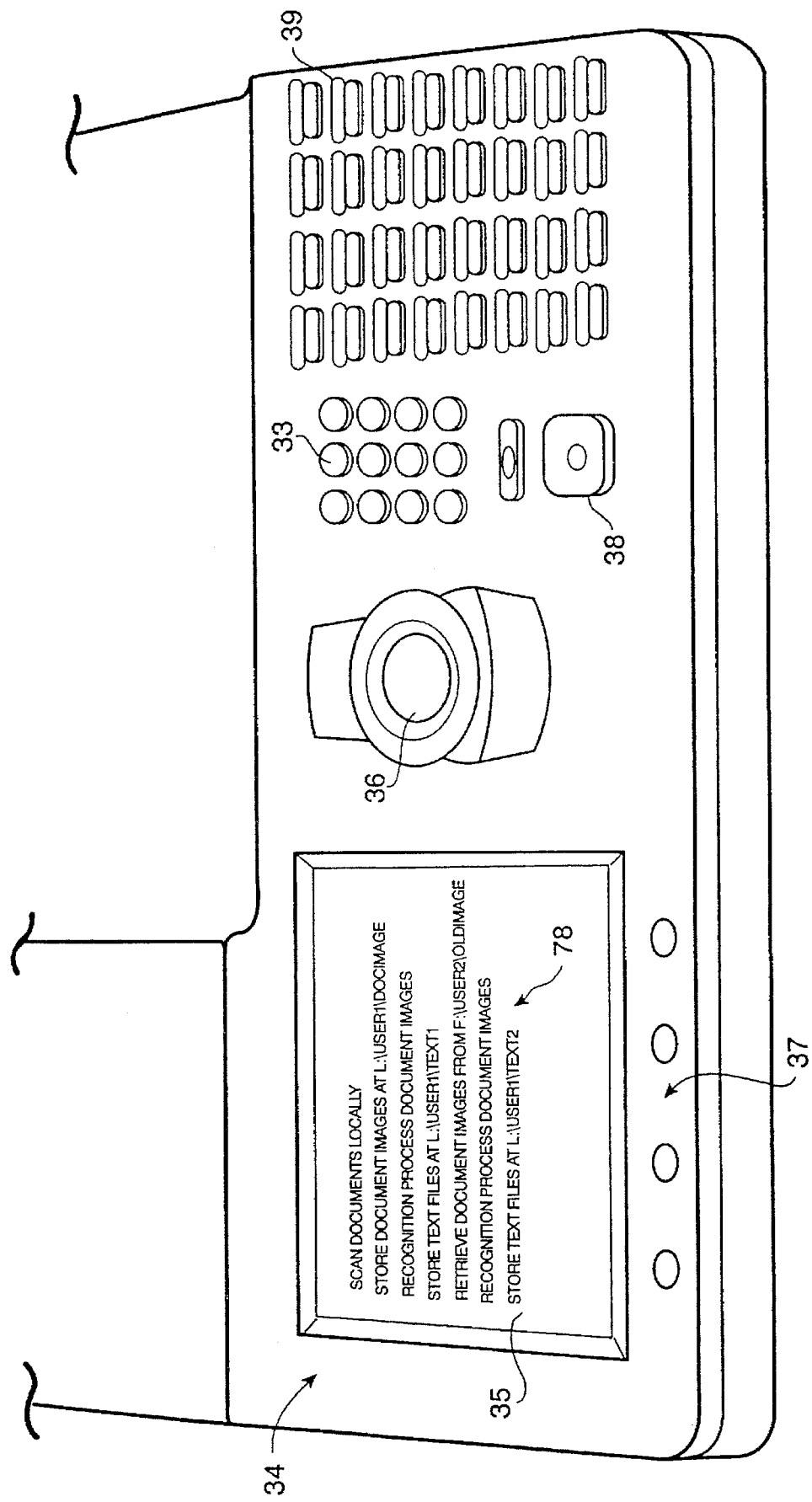

FIGS. 6 and 7 are close-up views of control panel 34 in connection with use and programming of programmable function keys 39.

As mentioned above, PICS equipment 20 is a networkable device and may be used by any of various network users who ordinarily are located remotely of PICS equipment 20. Consequently, when documents need to be processed by PICS equipment 20, a user ordinarily carries the documents from his workstation to PICS equipment 20. It is considered convenient to allow the user to program the precise document-processing functions that will be performed by PICS equipment 20 from the user's workstation so that those processing functions may be carried out by PICS equipment 20 with minimal user effort when the user is physically present at PICS equipment 20. On the other hand, there is a time lapse between when the user defines the image processing tasks that will be performed by PICS equipment 20 and when the user has physically arrived at PICS equipment 20 to carry out those image processing tasks; other users should not be precluded from using PICS equipment 20 during that time lapse.

As described herein, PICS equipment 20 preferably includes programmable function keys 39 which may be programmed by network users from their individual workstations, and which can be selected by the network user when they physically arrive at PICS equipment 20 for image processing. Image processing tasks can include scanning of new documents by scanner 22 of PICS equipment 20, retrieval of existing document images from various network storage media, recognition-processing of document images so as to create text files, and storage of text files in various network storage media, as well as related tasks such as execution of other information processing programs, such as spreadsheet or report-generating word processing programs, which use the stored text files. Function keys 39 can be programmed to chain some or all of these image processing tasks together, so as to provide a macro-like capability whereby a suite of image processing or related tasks are executed by the touch of a single one of function keys 39.

Preferably, the programmable function keys 39 are divided into two groups, one of the groups being programmable only by network administrator 43 and the other of the groups being programmable by any LAN user. The precise image processing functions performed by any of the keys may be displayed on display 35 as desired.

Briefly, FIGS. 6 and 7 are used for explaining a personal imaging computer system which is connectable to a local area network and which performs recognition-processing of document images so as to identify characters in the document images. A plurality of programmable function keys are provided on the personal imaging computer, each of the function keys being manipulable by an operator so as to cause the imaging computer system to perform a preprogrammed image-processing task. The plural programmable function keys are partitioned into at least two groups, wherein the first group is programmable only by a network administrator for the LAN and wherein the second group is programmable by any LAN user. Display means are provided for displaying an image of the plural function keys. In response to operator selection of an image of one of the plural function keys, the display means displays the function performed by that key.

More particularly, as shown in FIG. 6, an image 75 of programmable keys 39 is displayed by display 35. As further shown in FIG. 6, the image is partitioned into two groups; a first group 76 of programmable function keys which are restricted for programming only by network administrator 43, and a second group 77 of programmable function keys which are unrestricted and which are programmable by any LAN user. Preferably, though not shown in FIG. 6, each function key displayed at 75 includes a display of a user identification for the user that has currently programmed the key.

In operation, a user at his workstation 40 designates image processing tasks that are desired to be performed by PICS equipment 20, selects one of the programmable function keys in group 77, and programs the function key via local area network 31. Then, the user carries any documents that are to be processed by PICS equipment 20 to the physical location of PICS equipment 20. Upon arriving at PICS equipment 20, the user displays the display shown in FIG. 6, whereupon he can locate the key that he has programmed by reference to the displayed user identifications.

Using trackball 36, the user may then select any one of the displayed keys, including a key programmed by network administrator 43, a key programmed by himself, or a key programmed by any other LAN user. Upon selection of a displayed key, the current functions associated with that key are displayed as shown at 78 in FIG. 7. By physically manipulating the actual function key 39, PICS equipment 20 automatically performs the indicated function.

[2.2 Image Resolution Adjustment]

Figure 8:
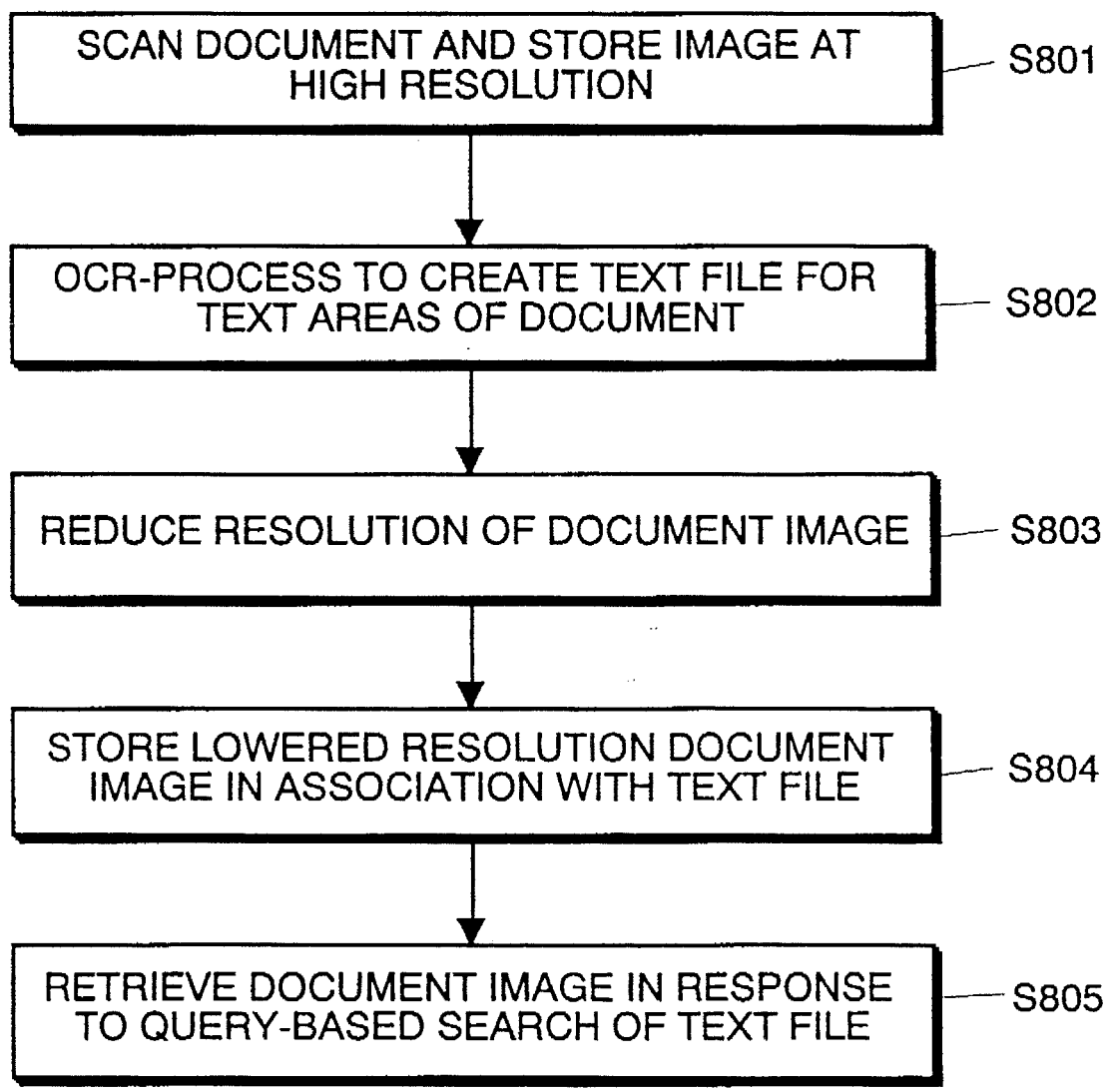
FIG. 8 is a flow diagram for explaining document storage and retrieval.

FIG. 8 is a flow diagram showing operation of PICS equipment 20 in which a document is scanned at a first resolution to form a gray-scale image of the document, the first resolution being suitable for recognition-processing text in the document, character images in the gray-scale image are recognition-processed so as to obtain a computer-readable file of the text, the resolution of the gray-scale image is reduced to a second resolution which is lower than the first resolution and which is suitable for visual perception and reproduction of the image, and the reduced-resolution image is stored in association with the computer-readable text file. Like the remaining flow diagrams in the appended figures, the process steps shown in FIG. 8 are executed by CPU 60 in accordance with stored program instruction steps stored on computer disk 75 (or other media) and transferred to RAM 79 for execution from there by CPU 60.

More particularly, at step S801, a document on document tray 21 is fed past scanner 22 so as to scan the document and create an image of the document. Preferably, the resolution at which the document is scanned is suitable for recognition processing, such as 400 dpi. On-the-fly JPEG processor 72 compresses the image as it is scanned in, and the compressed image is stored, such as in disk 75 or in RAM 79.

At step S802, the document image is subjected to optical character recognition processing to create a text file for text areas of the document. Optical character recognition processing is described in additional detail with reference to FIGS. 9(a), 9(b) and 9(c) in section 2.3, below.

At step S803, the resolution of the document image is reduced so as to lower the storage requirements for the document image. Preferably, the resolution is lowered so as to be sufficient for visual perception by human operators and for adequate reproduction by display on a computer screen or printing on paper. Presently, 70 dpi is preferred. Techniques for lowering image resolution are known, and it is preferred to select a technique that preserves, to the extent possible, any color or gray-scale content in the original image. Suitable techniques may also employ error-diffusion methods such as Burkes or Stucki methods so as to enhance the appearance of the lowered resolution image.

At step S804, the lowered resolution document image, in compressed or uncompressed form as desired, is stored in association with the text file from step S802. Storage may be to disk 75, but more preferably the document image and its associated text file are stored on one of network disks 42 or 54 as part of a searchable database.

Thus, as shown in step S805, the document image may be retrieved, for example, in response to query-based searches of the text file. More particularly, based on key word searches or other searches performed in response to operator queries, text files in the database are searched so as to identify text files which satisfy operator entered queries. Once such text files are identified, associated document images are retrieved and the document images are presented to the operator in desired form, such as by display or by printing.

Because the document is scanned in at a resolution sufficient for recognition-processing, but then is stored at a lowered resolution together with an associated text file, storage requirements for storing large databases of such documents are significantly lowered.

[2.3—Optical Character Recognition Processing—Summary]

Figure 9A:
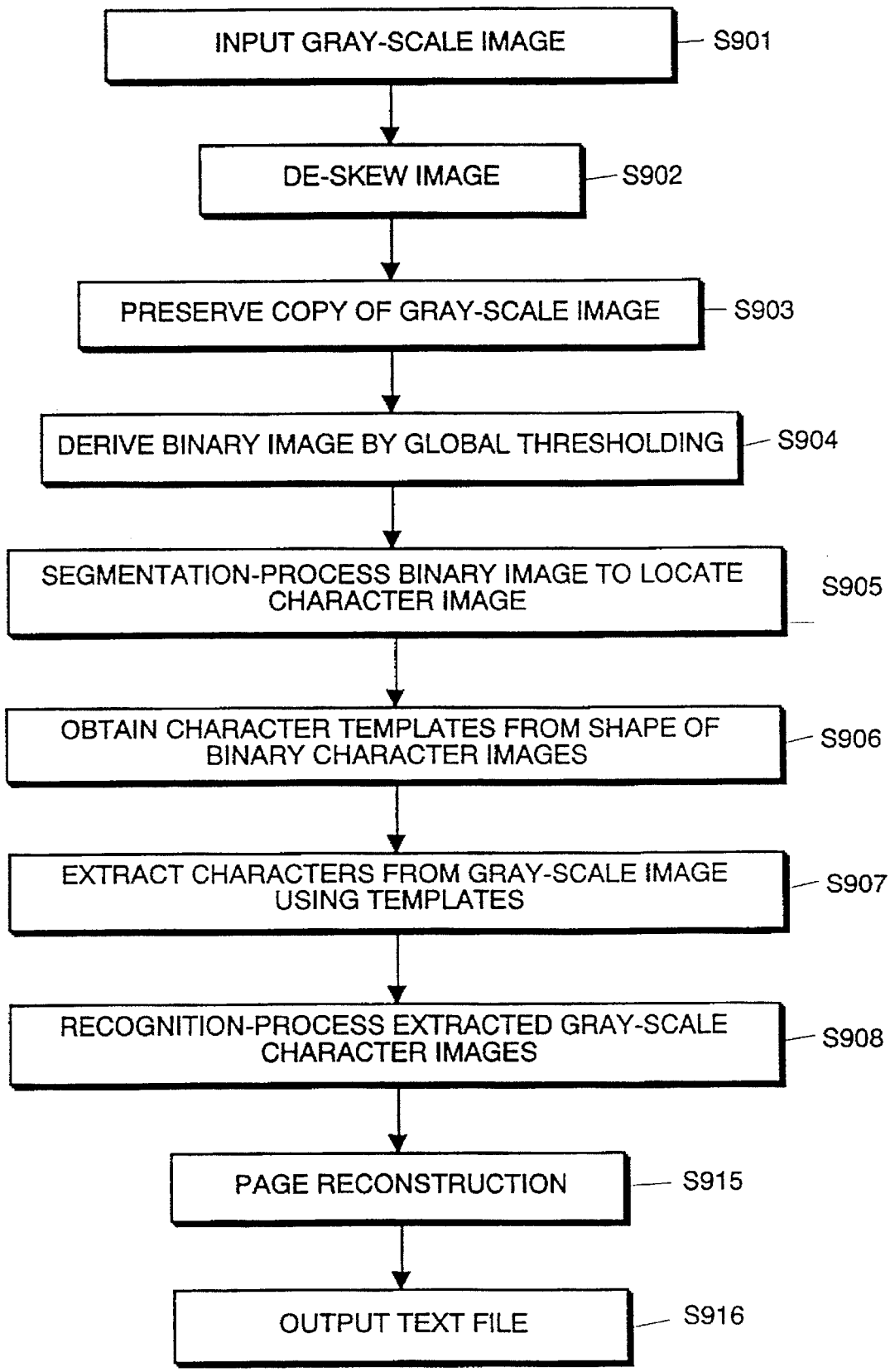
FIGS. 9(a), 9(b) and 9(c) are flow diagrams for explaining optical character recognition according to the invention.
Figure 9B:
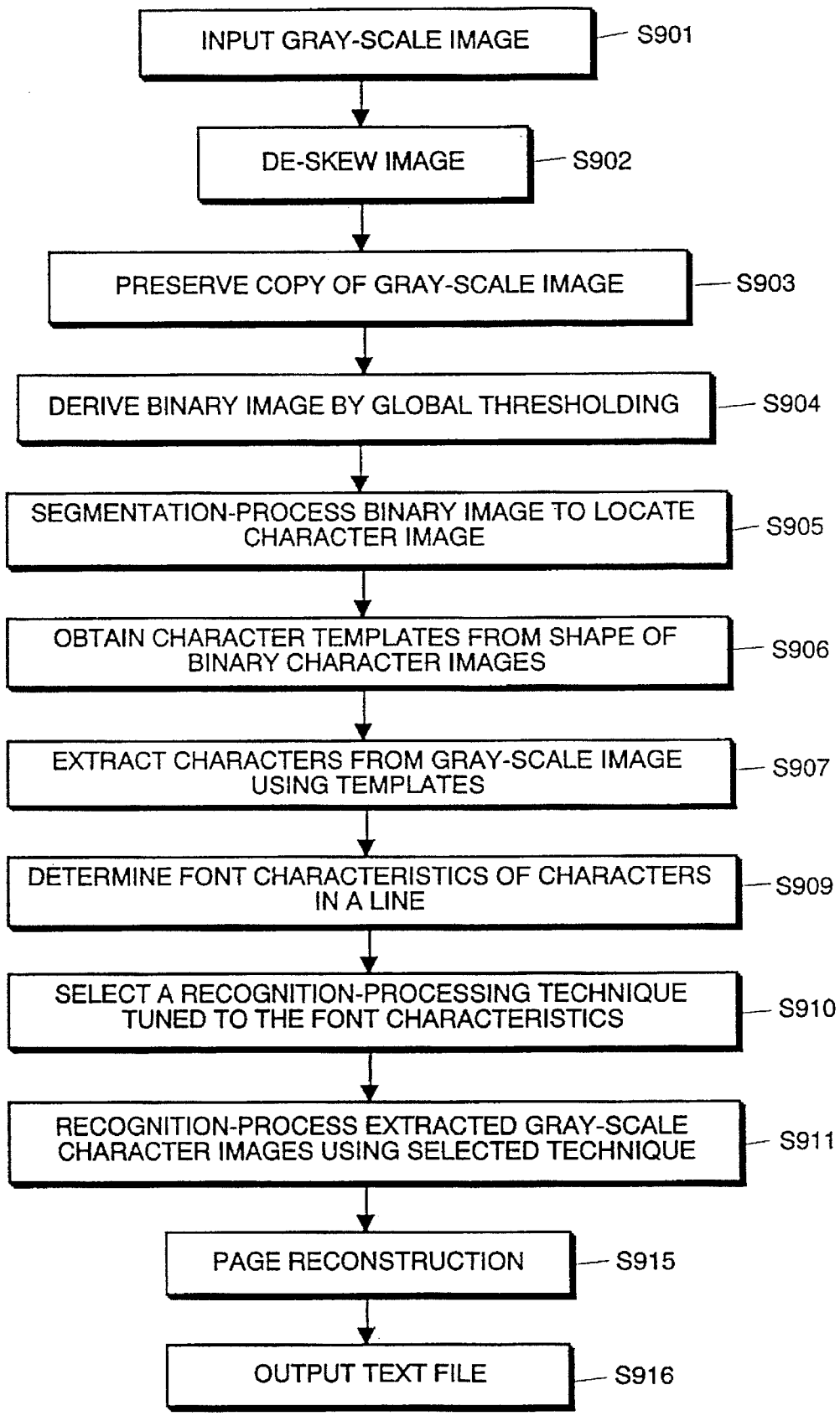
Figure 9C:
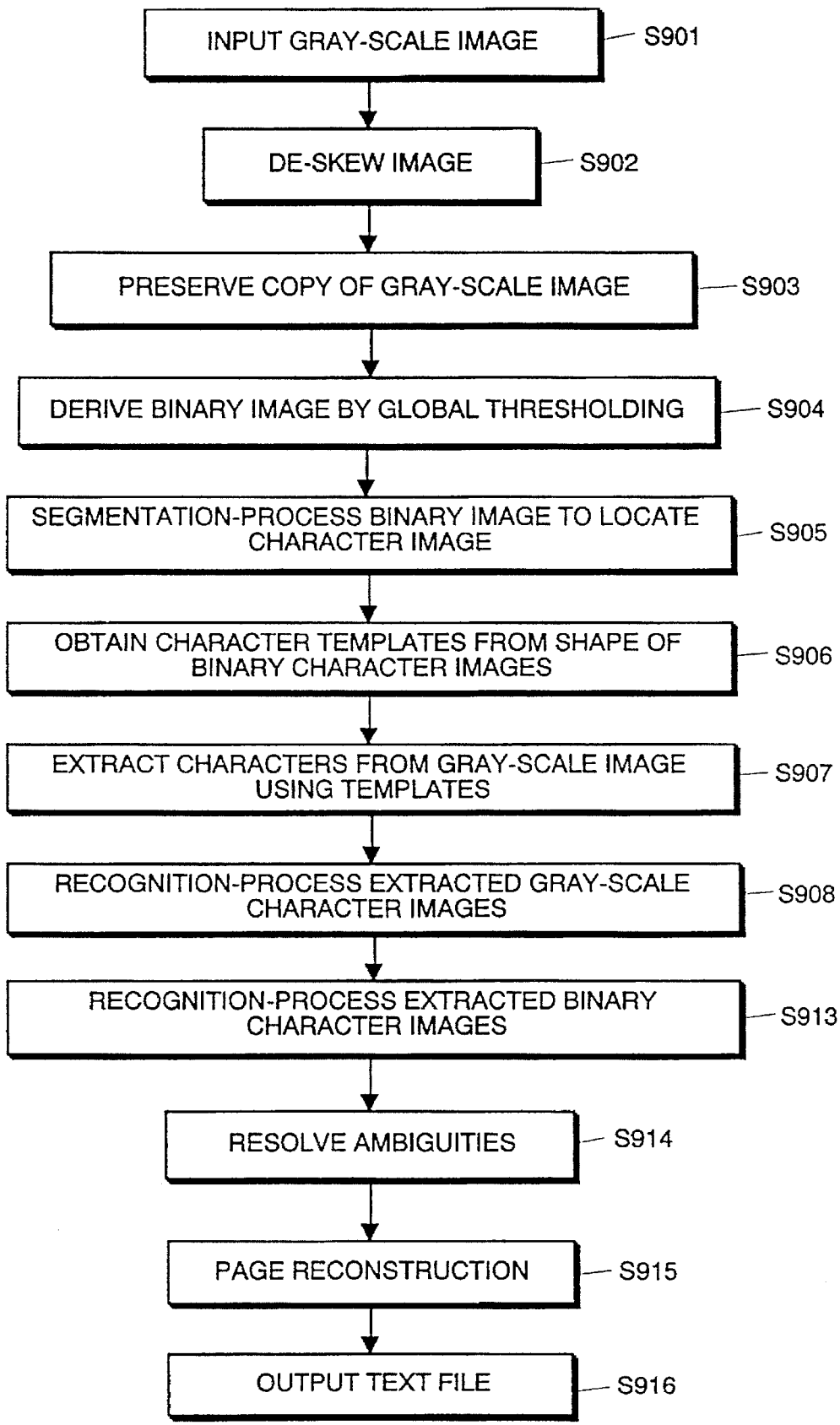

FIGS. 9(a), 9(b) and 9(c) summarize optical character recognition-processing by which characters in a document are identified, as described above at step S802. Briefly, according to any one of FIG. 9, a document is scanned to obtain a gray-scale image of the document, a binary image is generated from the gray-scale image by comparing the gray-scale image with a threshold, the binary image is segmented to locate individual characters within the binary image and to determine the shape of the individual characters, and gray-scale image information is extracted for each individual character from the gray-scale image using the location and shape of the character in the binary image as a template. The extracted gray-scale image information is then recognition-processed to determine the identity of the character, and the identity of the character is stored.

Thus, as shown in FIG. 9(a) at step S901, a gray-scale image of a document is input. Preferably, to input the gray-scale image of a document, the document is scanned by scanner 22, but it is also possible to input a document image that was created elsewhere, for example, a document image scanned remotely and transmitted to PICS equipment 20 via telephone line 29, local area network 31, or wide area network 32.

At step S902, the scanned-in image is deskewed. Image skew can result from improper scanning of the document such as by feeding the document crookedly past scanner 22, or it can result from scanning a document which is a mis-oriented copy of some other original document. Whatever its source, skew can cause errors in character recognition, so if its present skew is removed at step S902 as described in greater detail in section 2.4 in connection with FIGS. 10 and 11. In this regard, it is possible to store the skew corrections that are made in step S902 so that the skew corrections can be "un-done" after recognition-processing the image and in preparation for image storage (see step S804), but ordinarily the skewed image is simply discarded and only the de-skewed image is retained.

At step S903, a copy of the gray-scale image is preserved in RAM 79 so that gray-scale character images may later be extracted from it for recognition processing (see steps S907 and S908).

At step S904, a binary image is derived from the gray-scale image by comparing the gray-scale image with a threshold. Thresholding is described in greater detail below with reference to FIGS. 12 and 13 in section 2.5. The binary image so obtained is stored in RAM 79.

At step S905, the binary image is segmentation-processed to distinguish between text and non-text areas of the document and to locate individual characters within text areas of the document. Segmentation processing is described below in section 2.6 in connection with FIG. 14. Based on the location of individual characters within the binary image, character templates are obtained (step S906) from the shape of the binary character images.

In step S907, gray-scale character images are extracted from the gray-scale image stored in step S903 using the templates derived in step S906. The extracted gray-scale character images are then recognition-processed (step S908) so as to identify each individual character in text areas of the document.

In step S915, the character identities are stored in a computer readable text file such as in ASCII format. Page reconstruction is undertaken so that the reading order of the text file accurately reflects the reading order in the original document. For example, referring briefly back to FIG. 2, it will be appreciated that one line of text in the left hand column should not be followed by a corresponding line of text in the right hand column, but rather that all lines of text in the left hand column should be followed by all lines of text in the right hand column. Step S915 accomplishes this page reconstruction so as to obtain correct reading order for the text file.

In step S916, the text file is output such as by outputting to disk 75 or to network disks 42 and 54. As described above at step S804, the text file is often stored in association with its document file so as to assist in retrieving the document.

Figure 1A:
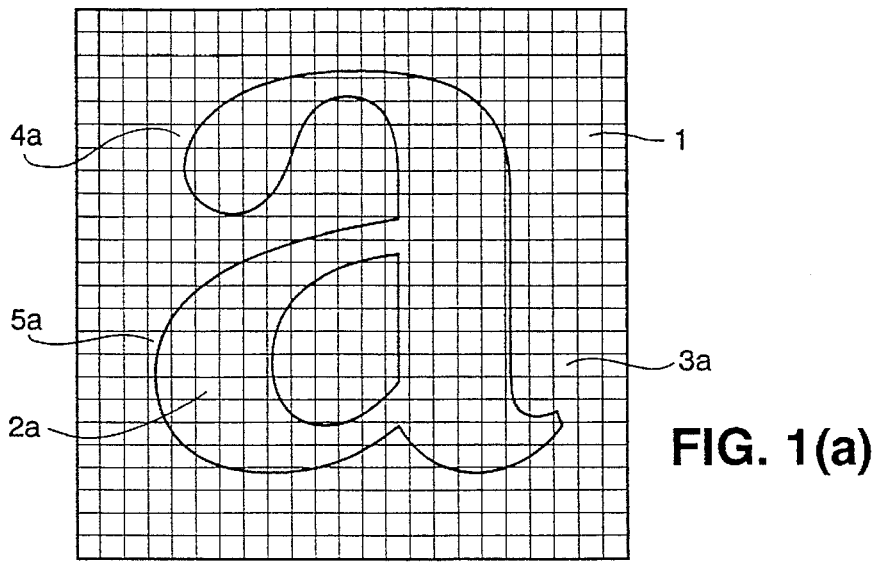
FIGS. 1(*a*), 1(*b*) and 1(*c*) are views for explaining differences between binary images and gray-scale images.
Figure 1B:
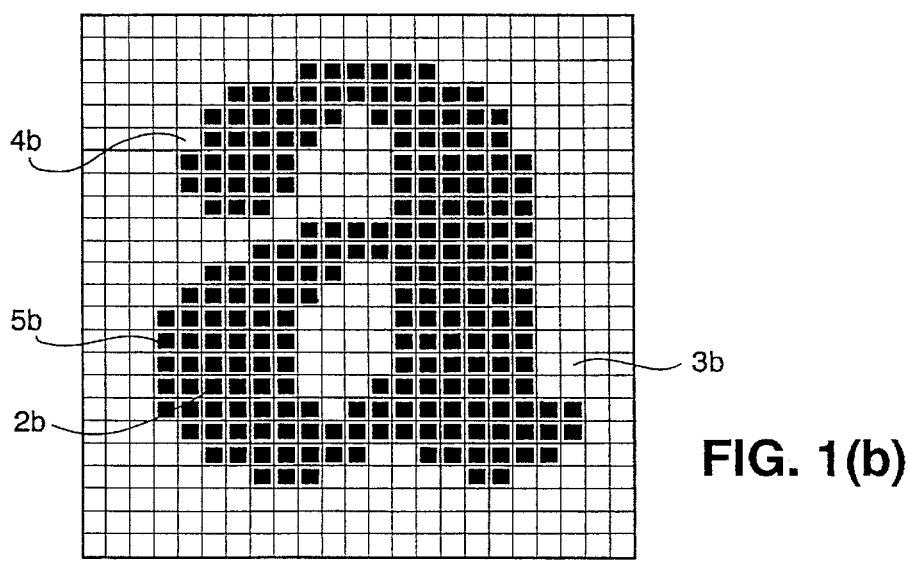
Figure 1C:
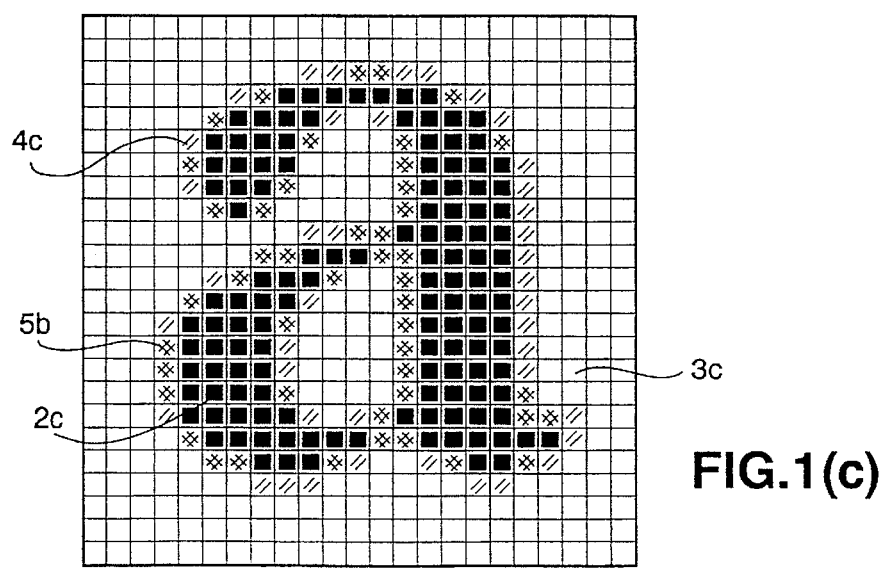
Figure 2:
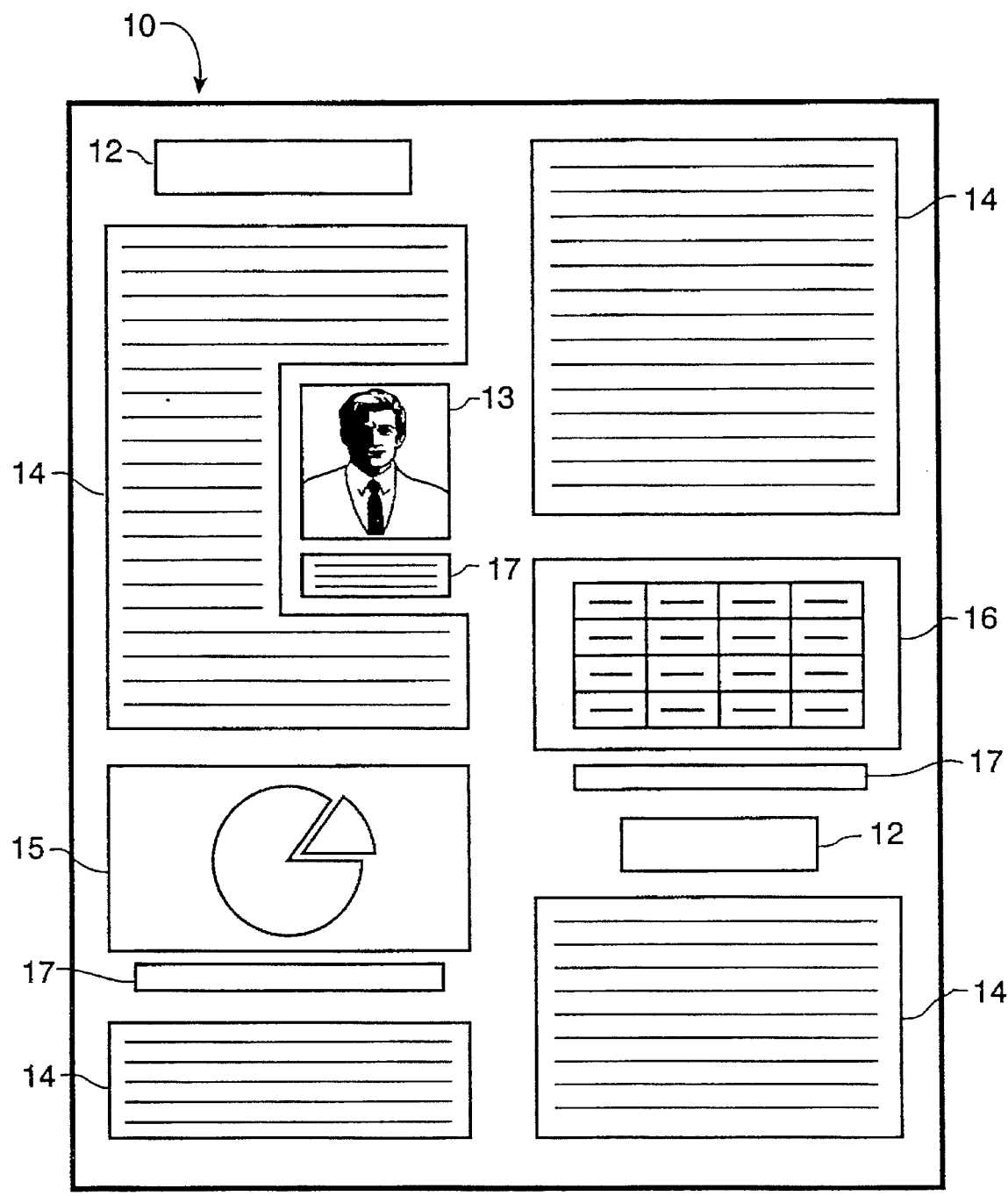
FIG. 2 is an illustration of a representative document page.

FIG. 9-2 is a flow diagram of a character recognition processing system which selects one of plural recognition processing techniques in accordance with font characteristics of characters in text areas of the document. The selected recognition processing technique is specifically tuned to the font characteristics, so that, for example, if the font characteristics indicate that a uniform-pitch font is being used, then a uniform-pitch recognition processing technique is selected, while if the font characteristics indicate that a sans-serif font is being used, then a sans-serif recognition processing technique is selected.

Thus, according to the character recognition processing system of FIG. 9(b), which determines the identity of characters from images of the characters, an image of a document which includes text areas is processed to locate lines of characters, font characteristics of the characters in each line are determined, one of plural recognition processing techniques is selected based on the font characteristics so determined, individual character images are extracted from each line, and each extracted character image is recognition-processed in accordance with the selected recognition processing technique.

More specifically, in steps S901, S902, S903, S904, S905, S906 and S907, a gray-scale image is input, the gray-scale image is de-skewed, a copy of the de-skewed image is preserved, a binary image is derived by global thresholding, the binary image is segmentation-processed to locate character images, character templates are obtained from the shape of the binary images, and characters are extracted from the gray-scale image using the templates, all as described above with respect to FIG. 9(a).

In step S909, font characteristics of characters in a line are determined. The determination may be made based on character attributes determined during segmentation processing, or the determination may be made based on the extracted characters from the binary or gray-scale image. "Font characteristics" include character spacing, such as uniform or proportional spacing, as well as the appearance of the font such as sans-serif or serif font, idealization, bold, or the like.

In step S910, one of plural recognition processing techniques is selected, the selected technique being tuned to the specific font characteristics determined in step S909. More particularly, if it is known that a font is, for example, Univers, which is a sans-serif font, then a recognition processing technique which is specifically tuned to a sans-serif font may be used. Such a recognition processing technique is particularly well-suited for recognition processing sans-serif characters since it is known, for example, that there will be fewer touching characters in a sans-serif font than with a serif font. Likewise, if step S909 determines that the font is a uniformly-spaced font such as Courier, then a uniform-spacing recognition technique may be selected which is specifically tuned for that font.

In step S910, extracted gray-scale character images are recognition-processed using the selected recognition technique. Then, in steps S915 and S916, page reconstruction is carried out so as to order identified characters into proper order and the text file so created is then output, as explained above in connection with FIG. 9(a).

FIG. 9(c) shows alternative processing according to the invention which yields improved recognition accuracy, especially when processing hard-to-recognize fonts such as italicized and proportionally-spaced fonts. According to the character recognition system illustrated in FIG. 9(c), the identity of characters in a document is determined by thresholding a gray-scale image of the document to obtain a binary image and by segmenting the binary image to locate binary images of characters and to determine attributes of the binary images of the characters. Gray-scale images of the characters are extracted based on the shape of the character in the segmented binary image, and both the gray-scale character image and the binary character image are recognition-processed to determine identities for the character. Any inconsistencies between the results of recognition-processing the gray-scale character image and recognition-processing the binary character image are then resolved based on the character attributes determined during segmentation-processing.

More particularly, in steps S901 through S908, a gray-scale image is input, the gray-scale image is de-skewed, a binary image is determined by thresholding, the binary image is segmentation-processed to locate character images, character templates are obtained from the shape of the binary images, gray-scale character images are extracted using the templates, and the extracted gray-scale character images are recognition-processed, as described above in connection with FIG. 9(a).

In step S913, binary character images which were extracted during segmentation-processing in step S905 are recognition-processed to determine the identity of the binary character images. In step S914, any inconsistencies between the results of recognition-processing gray-scale character images (in step S908), and recognition-processing binary character images (in step S913) are resolved based on physical image attributes of character images obtained during segmentation processing in step S905. For example, it is often difficult to distinguish between a lower case "L" ("l"), a numeric one ("1") and square brackets ("["or "]"), and because of differences in recognition processing in steps S908 and S913 it is possible that different identities will be determined for any one of those characters. In that situation, the inconsistencies are resolved by reference to physical attributes obtained during segmentation-processing in step S905. More particularly, and as detailed below with respect to FIG. 14, during segmentation processing, physical attributes such as pixel density and aspect ratio are determined for each character image (more precisely, as explained below, for each connected component in the image). Based on those physical attributes, the results of recognition-processing in steps S908 and S913 may be disambiguated.

In steps S915 and S916, page reconstruction and text outputting is performed as described above in connection with FIG. 9(a).

[2.4—De-skewing]

FIGS. 10(a) and 10(b) and FIGS. 11(a) through 11(c) are used for explaining de-skew processing according to the invention. As seen in these figures, an image is de-skewed by determining the skew of the image, de-skewing by mathematical rotational transformation in the case where the skew is greater than a predetermined limit such as ±10°, and de-skewing by vertical shifting of pixel data if the skew is less than the predetermined limit. De-skewing in accordance with this technique saves considerable time since, in most cases, it will not be necessary to perform a mathematical transformation of pixel data. Mathematical transformations of pixel data are expensive in terms of processor time, especially in situations where gray-scale pixel data is involved, since each pixel in the de-skewed image is a mathematical combination of several pixels in the skewed image. In addition, since de-skewed pixel values are mathematically calculated, generally speaking, not one de-skewed pixel value will be the same as a pixel value in the originally-scanned image, leading to increased recognition inaccuracies (e.g., replacing pixels whose values are "1" and "2", respectively, with their average value ("1½") results in pixels whose values are not anywhere in the original image). On the other hand, simple shifting of the skewed image to obtain a de-skewed image does not involve such mathematical combinations, and, in addition, results in pixel values from the originally-scanned image. Of course, since vertical shifting introduces some image distortions, if the skew of the image is too great, then mathematical transformations, which do not introduce such distortions, cannot be avoided.

Figure 10A:
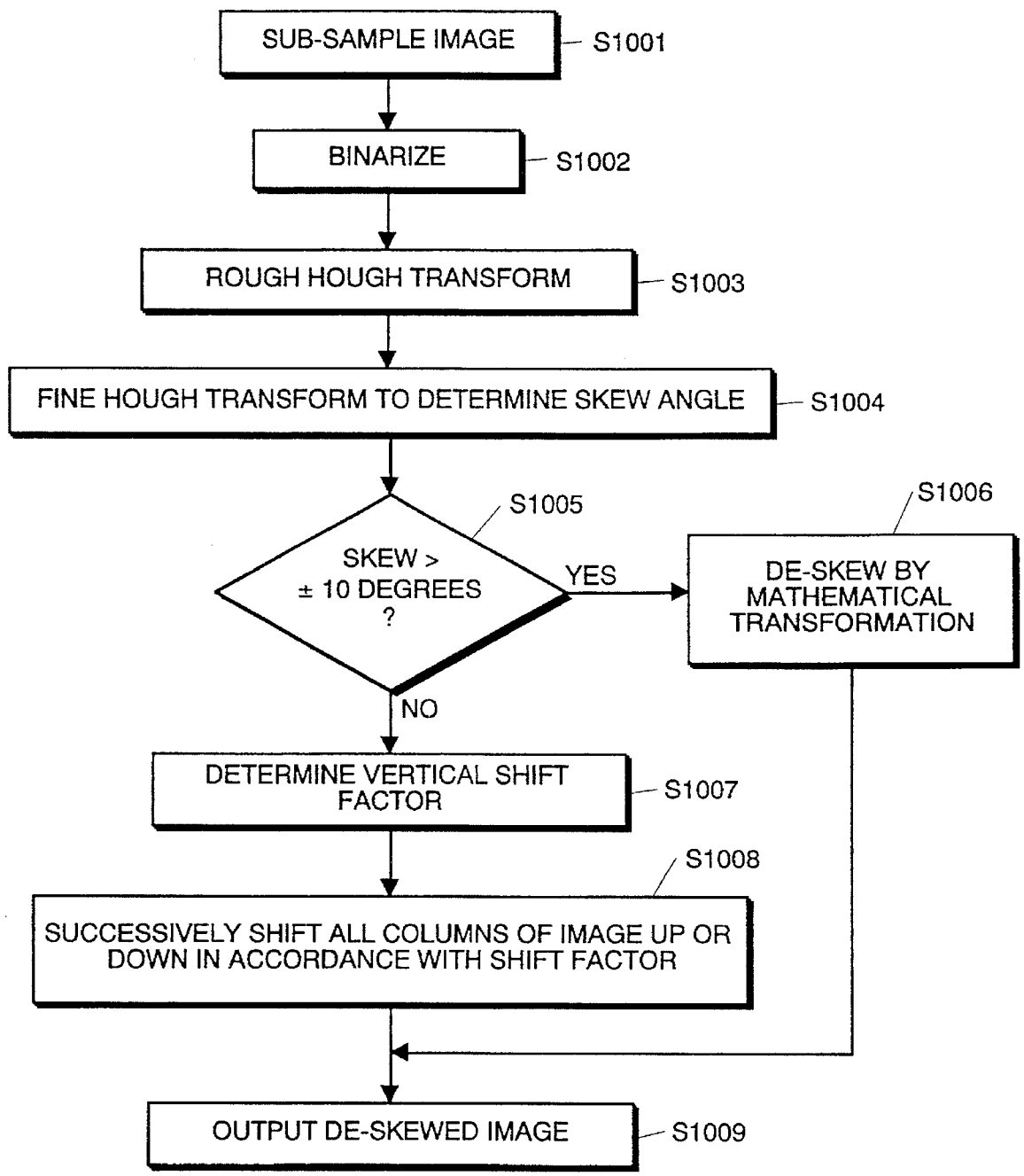
FIGS. 10(a) and 10(b) are flow diagrams for explaining how to de-skew images.

More particularly, as shown in FIG. 10(a), in steps S1001 through steps S1004 image skew is determined by baseline analysis of pixel data in the image, such as by application of a modified Hough transform like that described by Hinds, et al., "A Document Skew Detection Method Using Run Length Encoding And The Hough Transform", IEEE 10th International Conference On Pattern Recognition, June, 1990, page 464. In more detail, in step S1001, the image is sub-sampled so as to reduce the amount of data that needs to be processed. Preferably, the image is sub-sampled so as to yield and image with about 100 dpi resolution, which is sufficient for accurate skew detection. Thus, if the image being de-skewed is input at 400 dpi resolution, it is sub-sampled in a 1:4 ratio, meaning that only every fourth pixel in the original image is used in the sub-sampled image, so as to yield a 100 dpi sub-sampled image. Sub-sampling ratios are selected in the same way for different input resolutions, such as a 1:6 ratio for 600 dpi images.

In step S1002, the sub-sampled image is binarized, such as by application of an arbitrary threshold or by application of the threshold that is calculated in connection with FIGS. 12 and 13 (see below).

In step S1003, a rough Hough transform is applied to the sub-sampled and binarized data so as to determine roughly the skew angle in the original image. More particularly, the through transform may be applied between predetermined limits such as ±20° in rough angular resolution, such as every one degree. If desired, prior to Hough transformation, image baseline sensitivity can be amplified by replacing vertical runs of pixel data with the length of the vertical run positioned at the bottom of the vertical run, and by omitting pixel data which represents pictures and lines.

In step S1004, a fine Hough transform is applied to the sub-sampled and binarized image using the rough skew information obtained in step S1003. More particularly, in a ±1° neighborhood around the rough skew angle determined in step S1003, a fine Hough transformation is applied in fine angular resolution such as 0.1°.

Figure 11A:
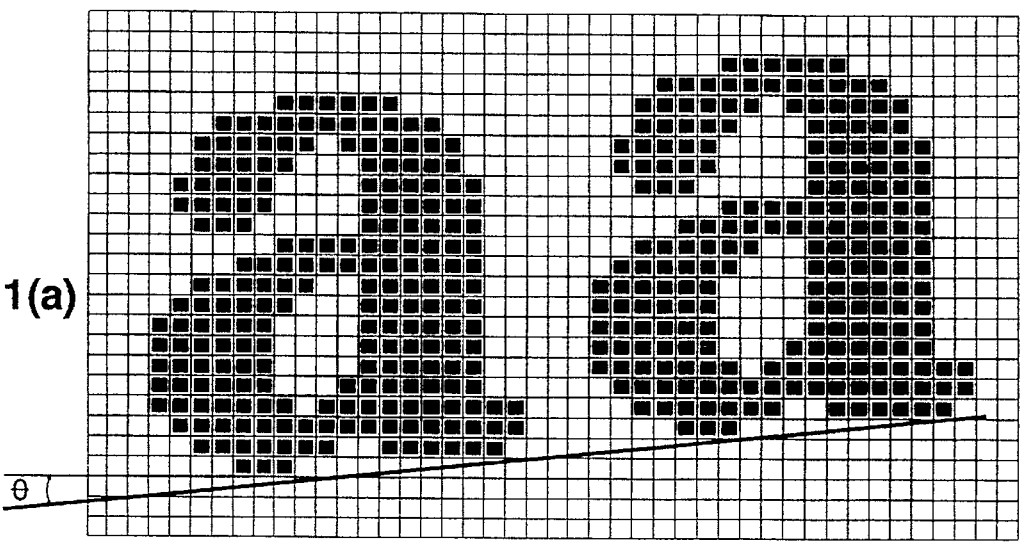
FIGS. 11(a), 11(b) and 11(c) are representative views of skewed and de-skewed pixel images.
Figure 11B:
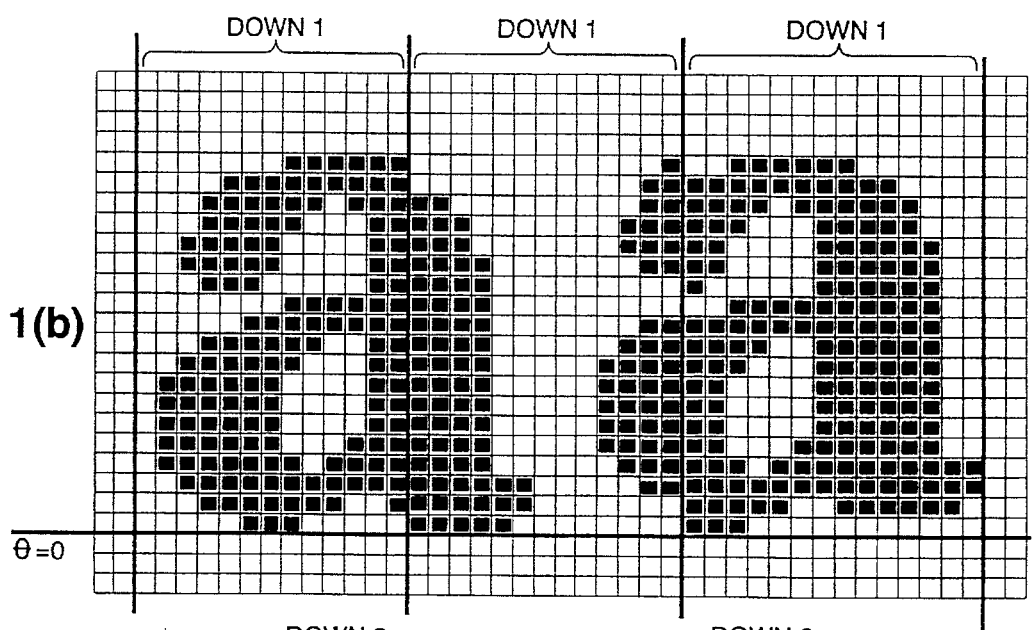

In step S1005, the skew angle determined in step S1004 is compared with a predetermined limit such as ±10°. If the skew is greater than the predetermined limit, then flow advances to step S1006 in which the image is de-skewed by mathematical transformation. On the other hand, if the skew is less than the predetermined limit, flow advances to step S1007 in which a vertical shift factor is determined based on the skew. More particularly, as shown in FIG. 11(a), a skew angle theta (θ) is first calculated as described above in steps S1001 to S1004. Then, from the skew angle θ, a vertical shift factor that will reduce the skew angle θ to zero is calculated; in the example of FIG. 11(a) the vertical shift factor is one pixel down for every 13 pixels across, corresponding to a skew angle of 4.4 degrees. Then, as shown in FIG. 11(b), working from left to right, all columns of the image are successively shifted upwardly or downwardly in accordance with the shift factor (step S1008). After shifting, it is observed that the skew angle θ has been reduced to zero.

Reverting to FIG. 10(a), once the image has been de-skewed either in accordance with mathematical transformation in step S1006 or in accordance with pixel shifting in step S1008, the de-skewed image is output (step S1009).

Figure 10B:
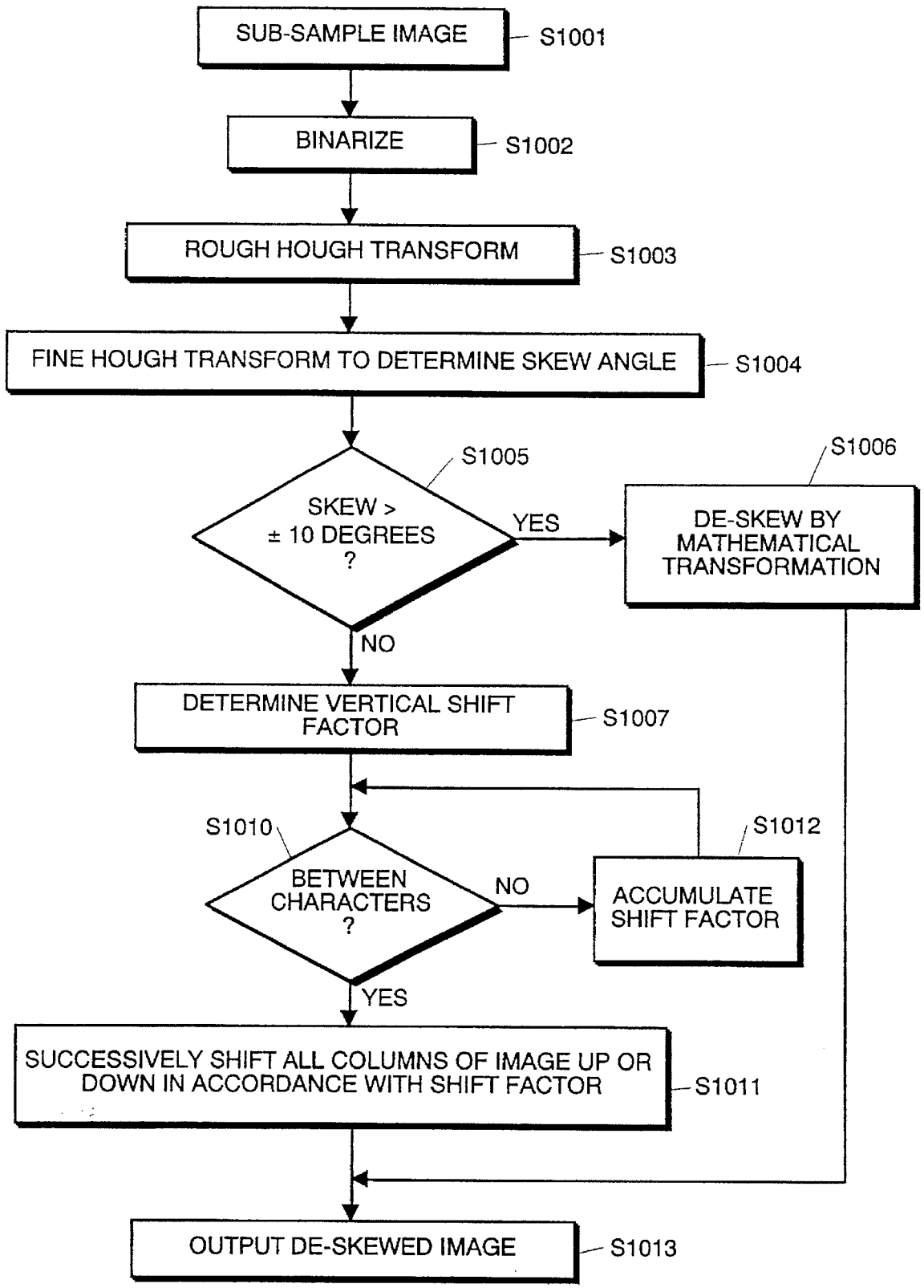

Although advantageous in terms of the savings of processing time, de-skewing by pixel shifting can sometimes, in certain circumstances, distort the image of the character. For example, as seen in FIG. 11(b), each of the images of the character "a" is distorted because shifting downwardly has occurred in the middle of each of those characters. FIG. 10(b) shows flow processing which avoids this kind of distortion.

Figure 11C:
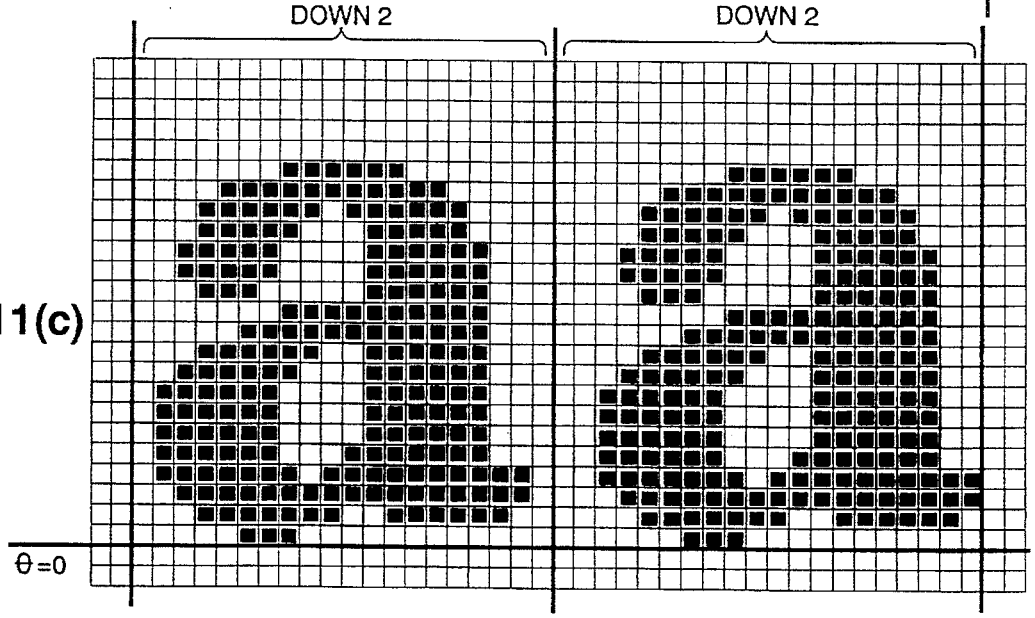

In FIG. 10(b), steps S1001 through S1007 are identical to that of FIG. 10(a). In step S1010, when it is time to shift columns of the image upwardly or downwardly in accordance with the shift factor, CPU 60 determines whether or not the image is in a blank space between characters. If CPU 60 determines that it is between characters, then flow advances to step S1011 in which all columns of the image are successively shifted upwardly or downwardly, relative to previously-shifted columns, in accordance with the shift factor. On the other hand, if not between characters, then the shift factor is simply accumulated (step S1012), and no shifting takes place. Flow returns to step S1010 and shifting takes place only when between characters. Thus, as shown in FIG. 11(c), shifting occurs between the two "a" characters and occurs at the accumulated shift factor which, in this case, is "down 2". Flow then proceeds as before with the de-skewed image being output at step S1013.

By processing in accordance with FIG. 10(b), it is possible to avoid distortion of each character because pixel shifting occurs only between characters and not in the middle of characters.

[2.5—Thresholding]

Figure 12:
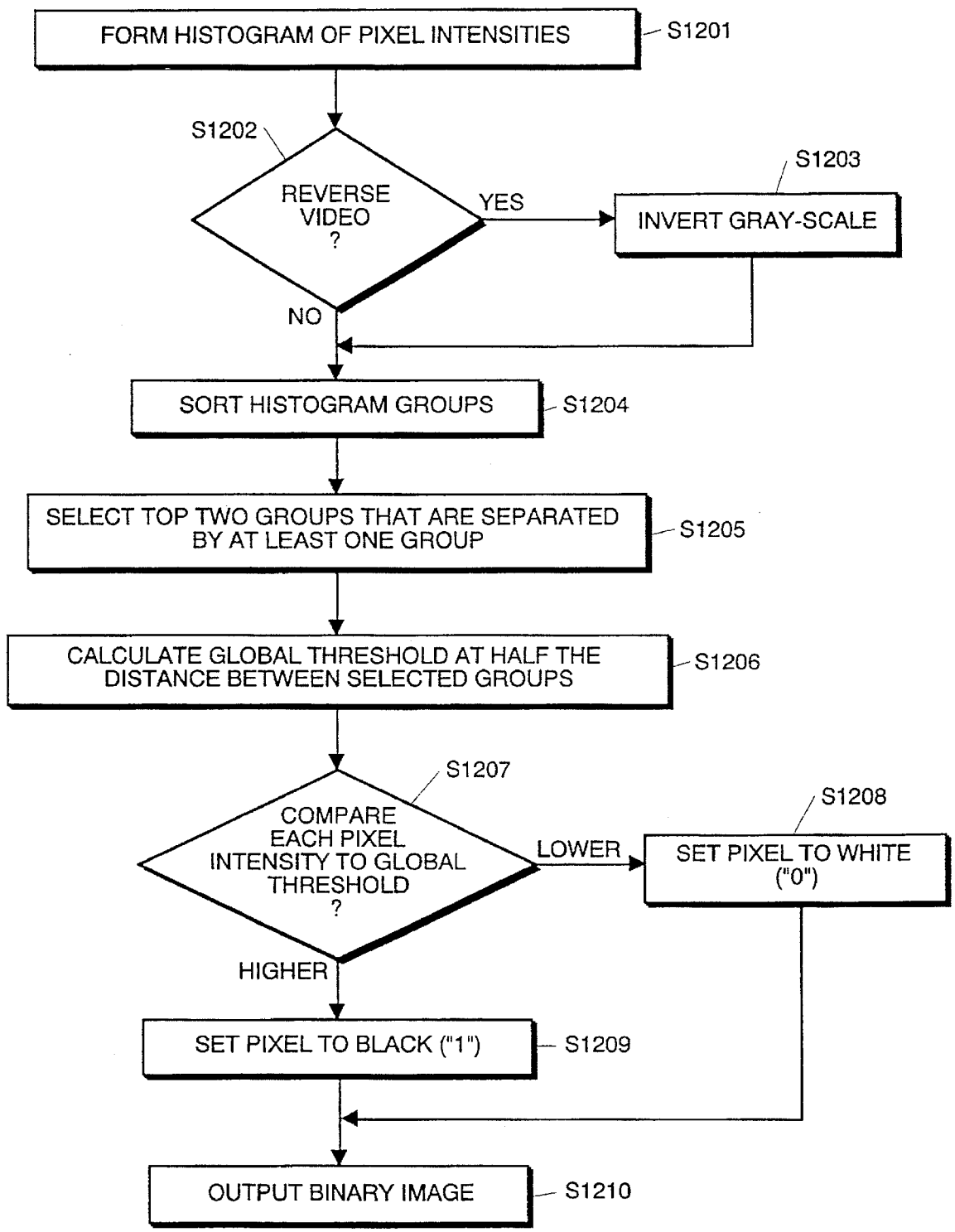
FIG. 12 is a flow diagram for explaining how to form binary images from gray-scale images by thresholding.

FIG. 12 is a detailed flow diagram showing the thresholding operation depicted in step S904. According to the thresholding system shown in FIG. 12, a binary image is formed from a gray-scale image by forming a histogram of pixel intensities of the gray-scale image, identifying the top two groups in the histogram that are separated by at least one histogram group, calculating a global threshold at half the distance between those two top groups, comparing each pixel in the gray-scale image to the global threshold so as to binarize each pixel, and outputting a binary image corresponding to the gray-scale image.

Thus, in step S1201, a histogram of pixels in pixel intensities is formed for the gray-scale image. As illustrated in FIG. 13(a), the histogram includes plural groups of pixel intensities, the height of each group being determined based on the number of pixels in the gray-scale image that fall within the group. In FIG. 13(a), eight groups, I through VIII, have been designated based on a gray-scale image intensity which varies from 0 to 255. Other groupings are possible, but the grouping shown in FIG. 13(a) is preferred because it is simple to implement.

In step S1202, the histogram is examined to determine whether the gray-scale image is a "reverse video" image, meaning that the image is not black-on-white, as in conventional images, but rather is white-on-black. If the histogram indicates that the gray-scale image is a reverse video image, then the gray-scale is inverted (step S1203) so as to convert the image to a conventional black-on-white image.

In step S1204, the histogram groups are sorted in descending order based on the height of the groups. In the example of FIG. 13(a), group VIII, which has the highest numerical value, is the first group and group V, which has the lowest numerical value, is the last group. Thus, the groups in FIG. 13(a) sorted as shown in FIG. 13(b).

In step S1205, the top two groups that are separated by at least one group are selected. Thus, as shown in FIG. 13(b), groups VIII and VII are first compared because they are the top two groups. However, because they are not separated by at least one group (i.e. numerically, group VIII is immediately adjacent to group VII), groups VIII and VII are not selected. Instead, groups VII and II, which are the next top two groups, are compared. Since groups VII and II are separated by at least one group (in this example, they are separated numerically by four groups), groups VII and II are selected in step S905.

In step S1206, the global threshold is calculated at half the distance between the two groups selected in step S1205. Thus, as shown in FIG. 13(a), groups II and VII are separated by a distance of 160 (i.e. 192−32). The global threshold for this representative gray-scale image is therefore calculated at TH=160÷2=80.

In step S1207, the intensity of each pixel in the gray-scale images is compared to the global threshold calculated in step S1206 to binarize the gray-scale image. As shown in FIG. 12, if the comparison indicates that the pixel intensity is less than the global threshold, then the pixel is set to a binary "0"

indicating that the pixel is white (step S1208). On the other hand, if the pixel intensity is higher than the global threshold, the pixel is set to a binary "1" indicating that the pixel is black (step S1209).

After all pixels of the gray-scale image have been compared to the global threshold and binarized accordingly, the binary image is output (step S1210).

[2.6—Segmentation-Processing]

Figure 14:
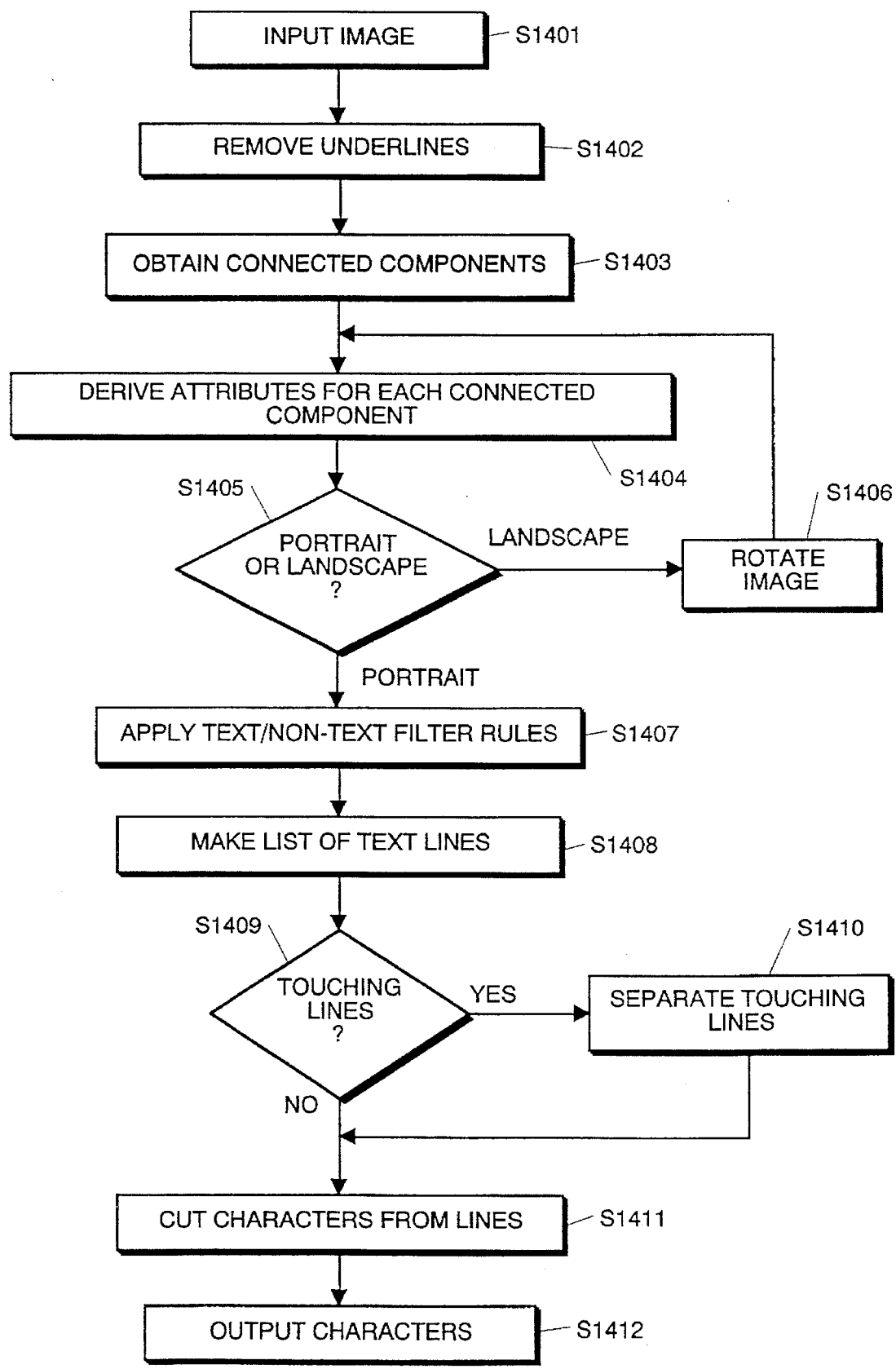
FIG. 14 is a flow diagram for explaining segmentation processing according to the invention.

FIG. 14 is a flow diagram illustrating segmentation-processing, as mentioned above in step S905, by which text and non-text areas in a document image are identified and by which individual characters in text regions are extracted. Processing in FIG. 14 proceeds by way of connected component analysis of the binary image derived in step S904. A "connected component" is a group of connected black pixels surrounded everywhere by white pixels. For ordinary printed pages like those in a printed copy of this patent application, a connected component is usually a character or a separated part of a character, but for underlined characters or cursive script, a connected component may be a group of connected characters.

Generally, as shown in FIG. 14, text areas in a document image, which includes both text areas and non-text areas, are located by identifying connected components in the document image, deriving image attributes such as pixel density and aspect ratio for each of the connected components, and filtering each connected component based on the image attributes so as to separate connected components representing a text area from connected components representing a non-text area. Filtering is performed by successively applying plural sets of rules to the image attributes for each unknown type of connected component until it can be determined whether the unknown connected component is text or non-text.

More particularly, in step S1401, an image to be segmentation-processed is input. Preferably, the image is the binary image derived by thresholding in step S904 but, in general, the image may be any image that needs to be segmentation-processed. For example, the image may be an image that is scanned by a digital copier in preparation for image reproduction. In that case, segmentation-processing may be needed to determine which areas of the image are text and which are non-text so as to control reproduction characteristics based on that determination. Thus, the segmentation-processing that is described here may be employed in a determination of which areas of an image are text areas so that those areas may be reproduced by a digital copier using only black toner, and which areas of an image are non-text areas so that those areas may be reproduced by a digital copier using cyan, magenta, yellow and black toner in combination.

In step S1402, underlining in the image is detected and removed. Underlines can distort the connected component analysis that is to follow by causing all underlined characters to be identified as a single connected component rather than several separate connected components. Underline removal is described in more detail below in section 2.6.1 in connection with FIGS. 18 and 19.

Figure 15:
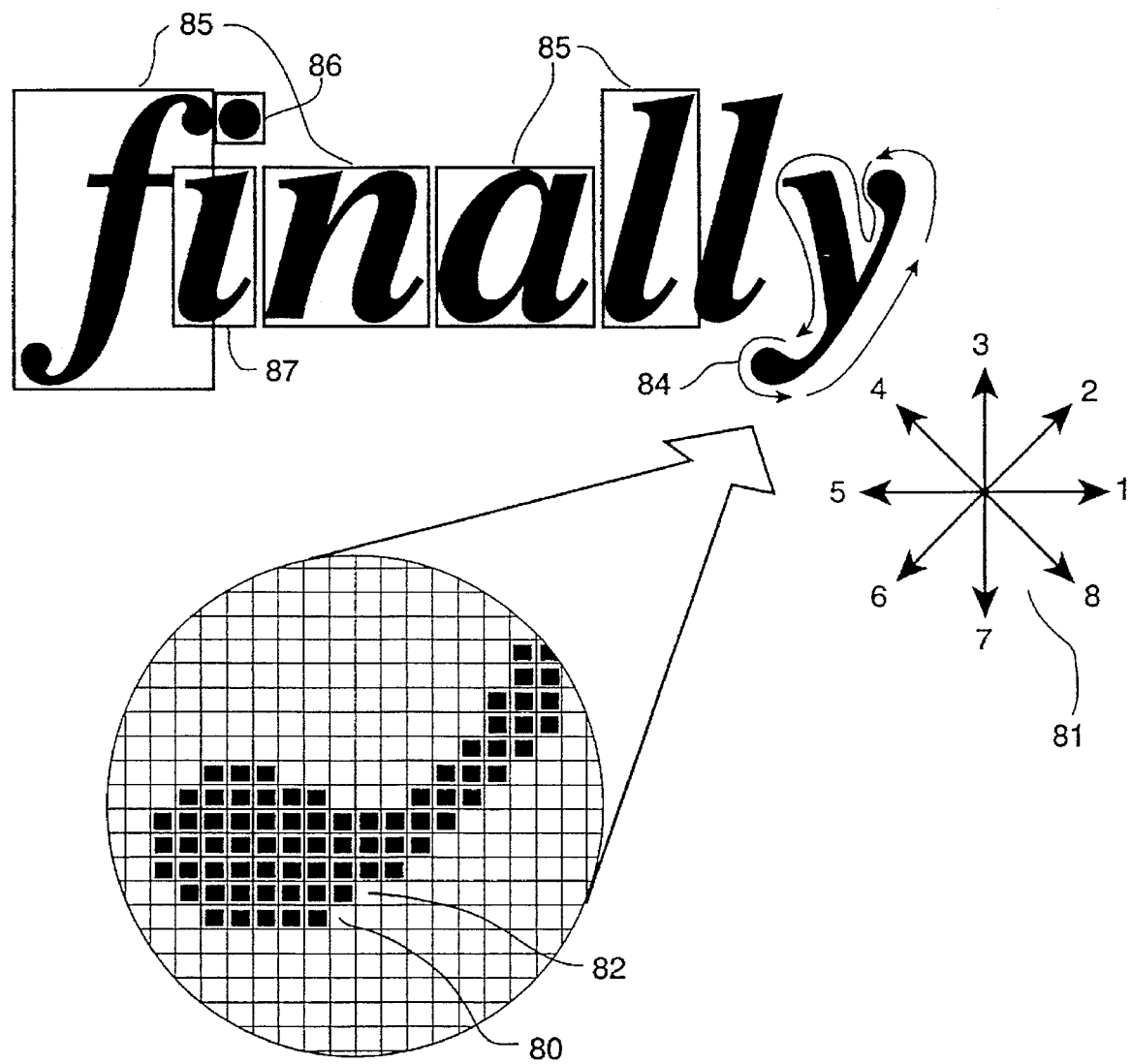
FIG. 15 is a view for explaining derivation of connected components within an image.

In step S1403, the image is analyzed to identify all connected components. As mentioned above, a "connected component" is a group of connected black pixels surrounded everywhere by white pixels. Thus, as shown in FIG. 15, which depicts pixels forming an image of the word "finally", connected components are obtained by eight-direction analysis of each pixel in the image. More particularly, starting from an initial pixel such as pixel 80, which is the lower right-most black pixel in the image shown in FIG. 15, surrounding pixels are examined in eight directions as shown by cluster 81 to determine where there are any adjacent black pixels. Pixel 82 is such a black pixel, and eight-direction processing proceeds again from pixel 82 whereby the perimeter of a connected component is traversed as shown by arrows 84.

Each pixel in the image is analyzed as described in FIG. 15 so as to identify and obtain the location of each connected component in the image, including internal connected components such as individual entries in a framed table (see 16 in FIG. 2). In this embodiment, the location of each connected component is defined by the location of a circumscribing rectangle, such as rectangles 85 in FIG. 15.

Figure 20:
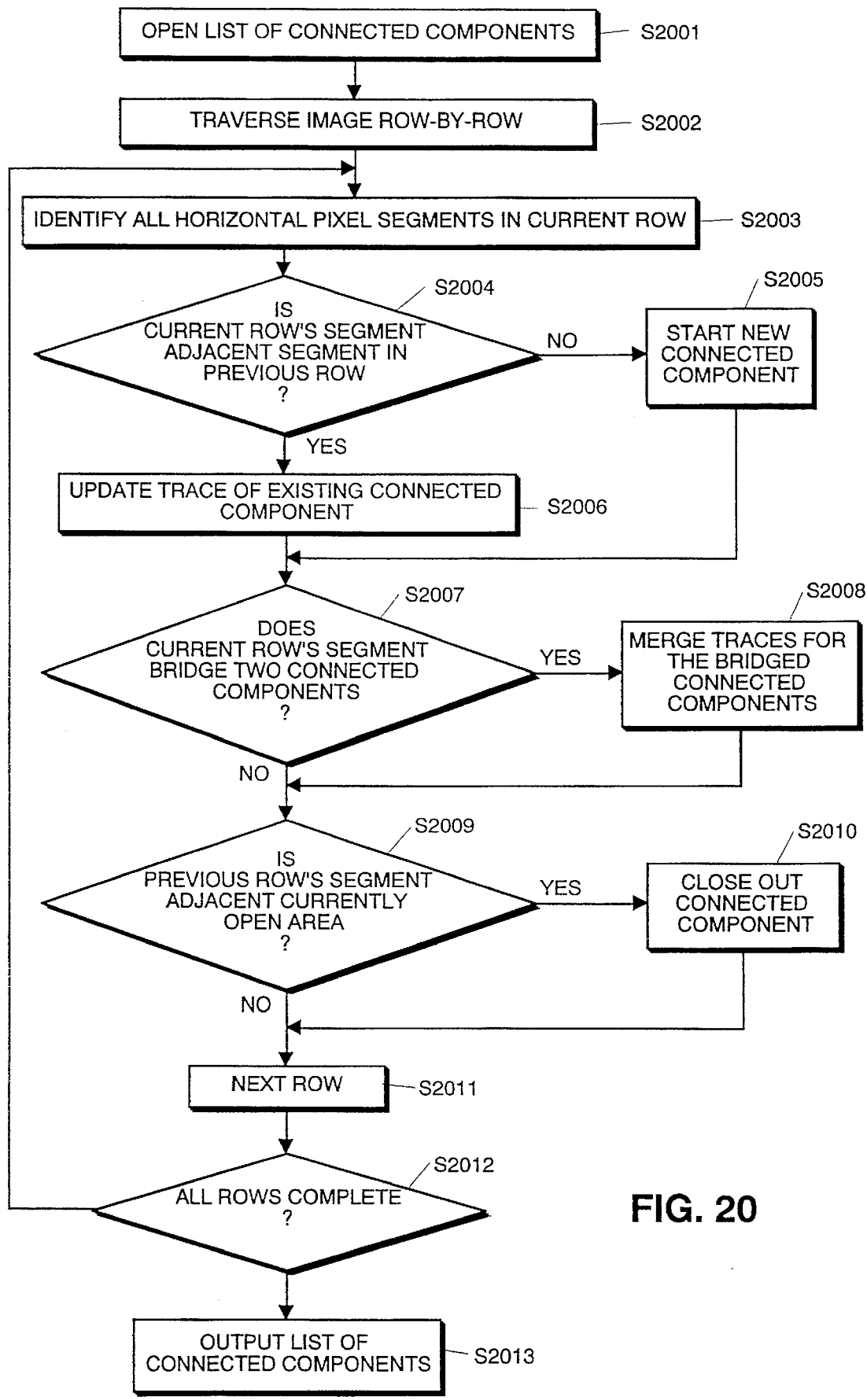
FIG. 20 is a flow diagram for explaining connected component analysis.
Figure 21:
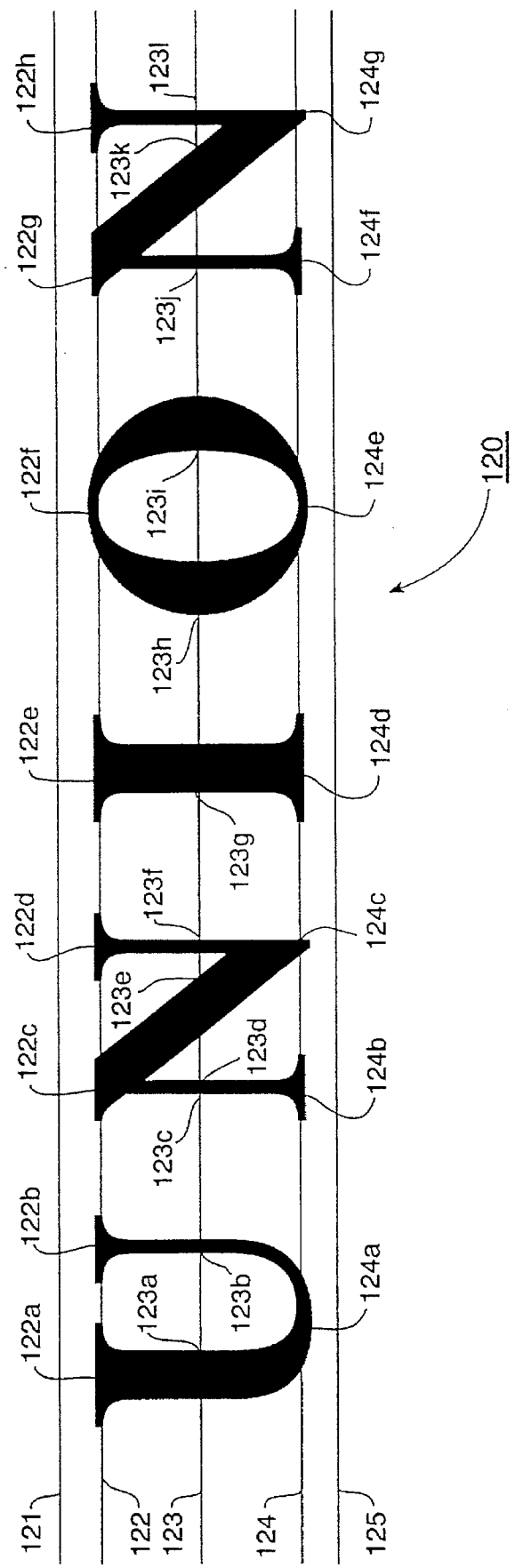
FIG. 21 is a view showing how connected components are derived for an image of the word "UNION".
Figure 22A:
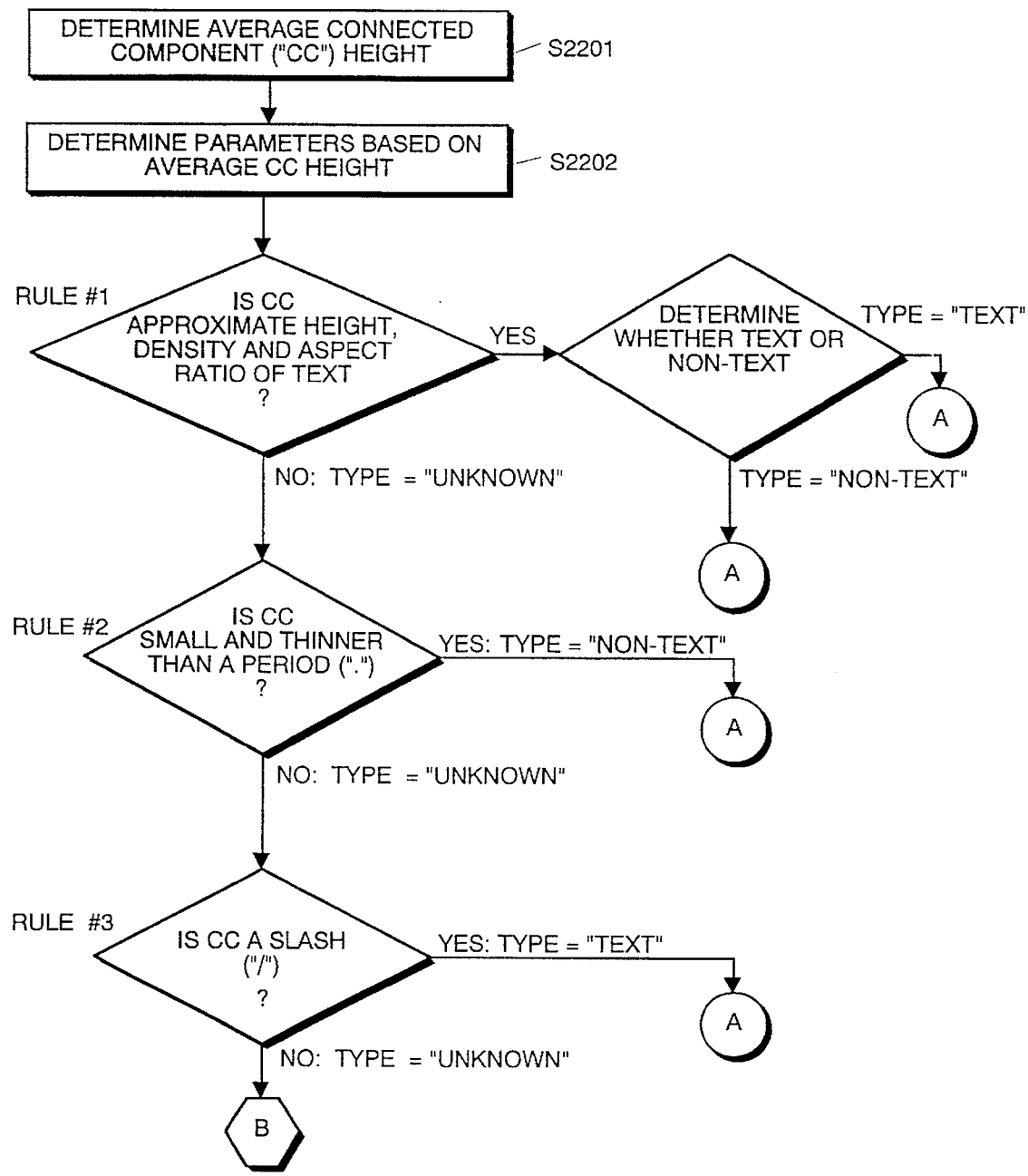
FIGS. 22(a) through 22(f) is a flow diagram showing rule-based processing of connected components.
Figure 22B:
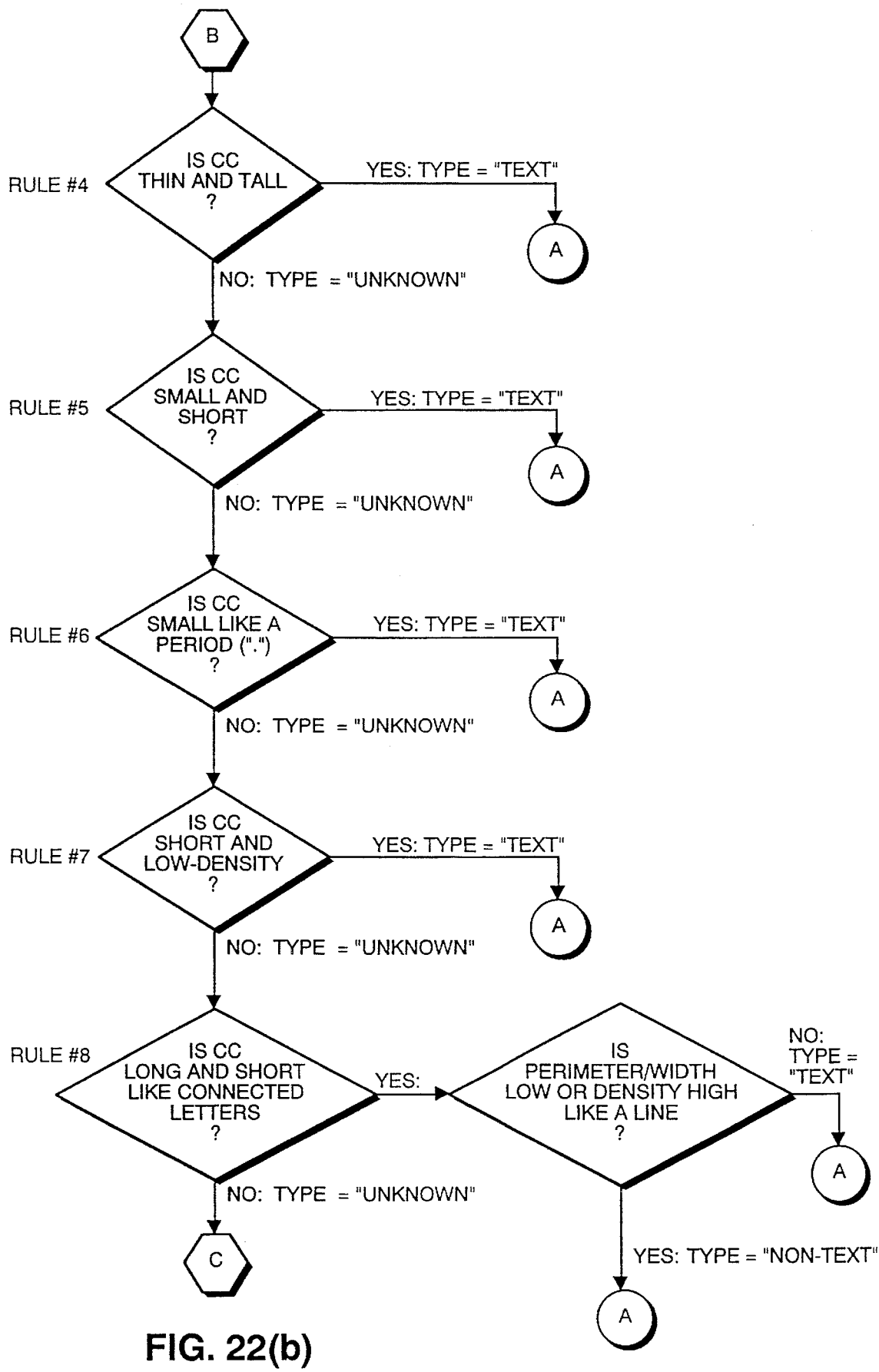
Figure 22C:
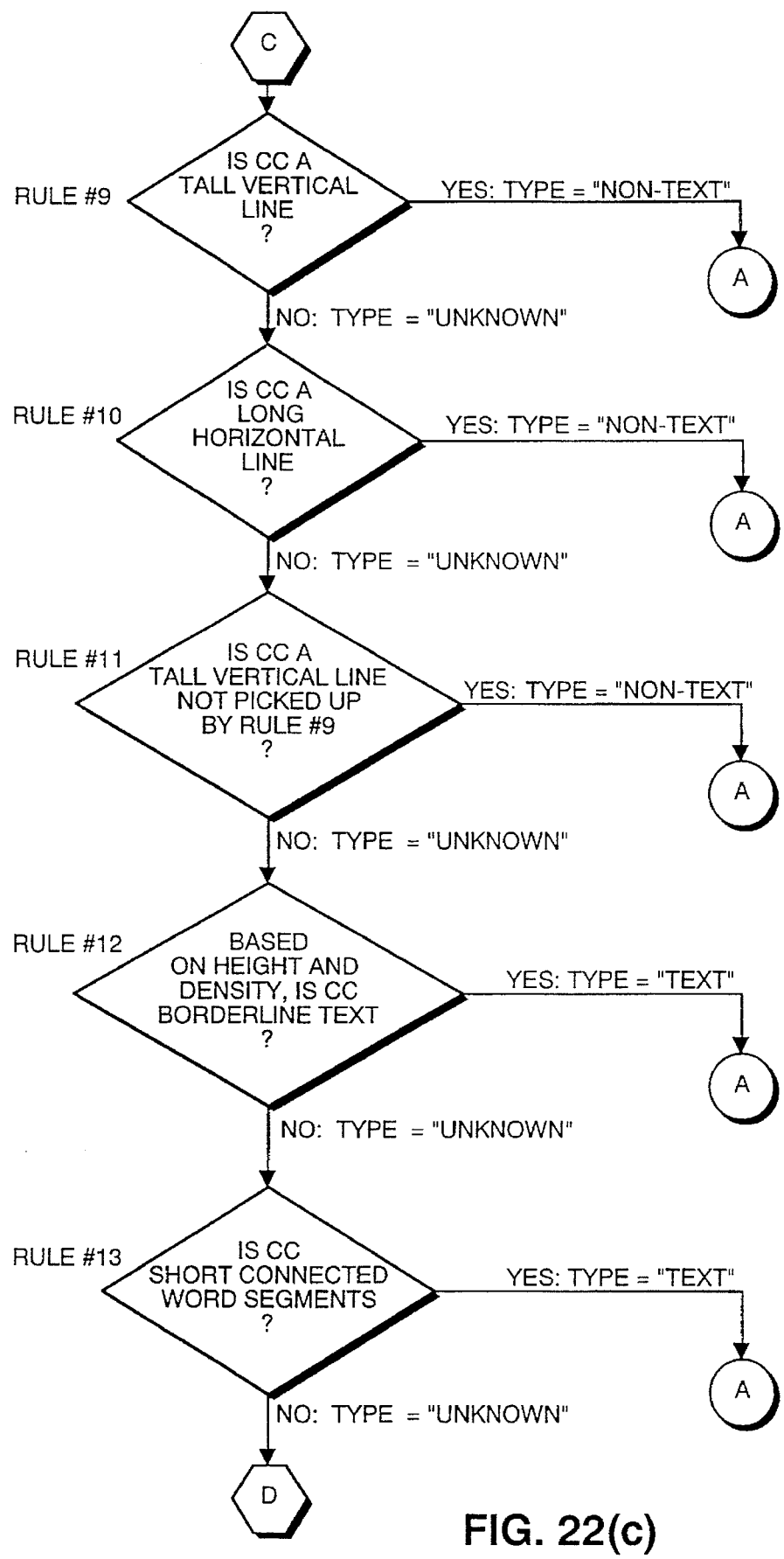
Figure 22D:
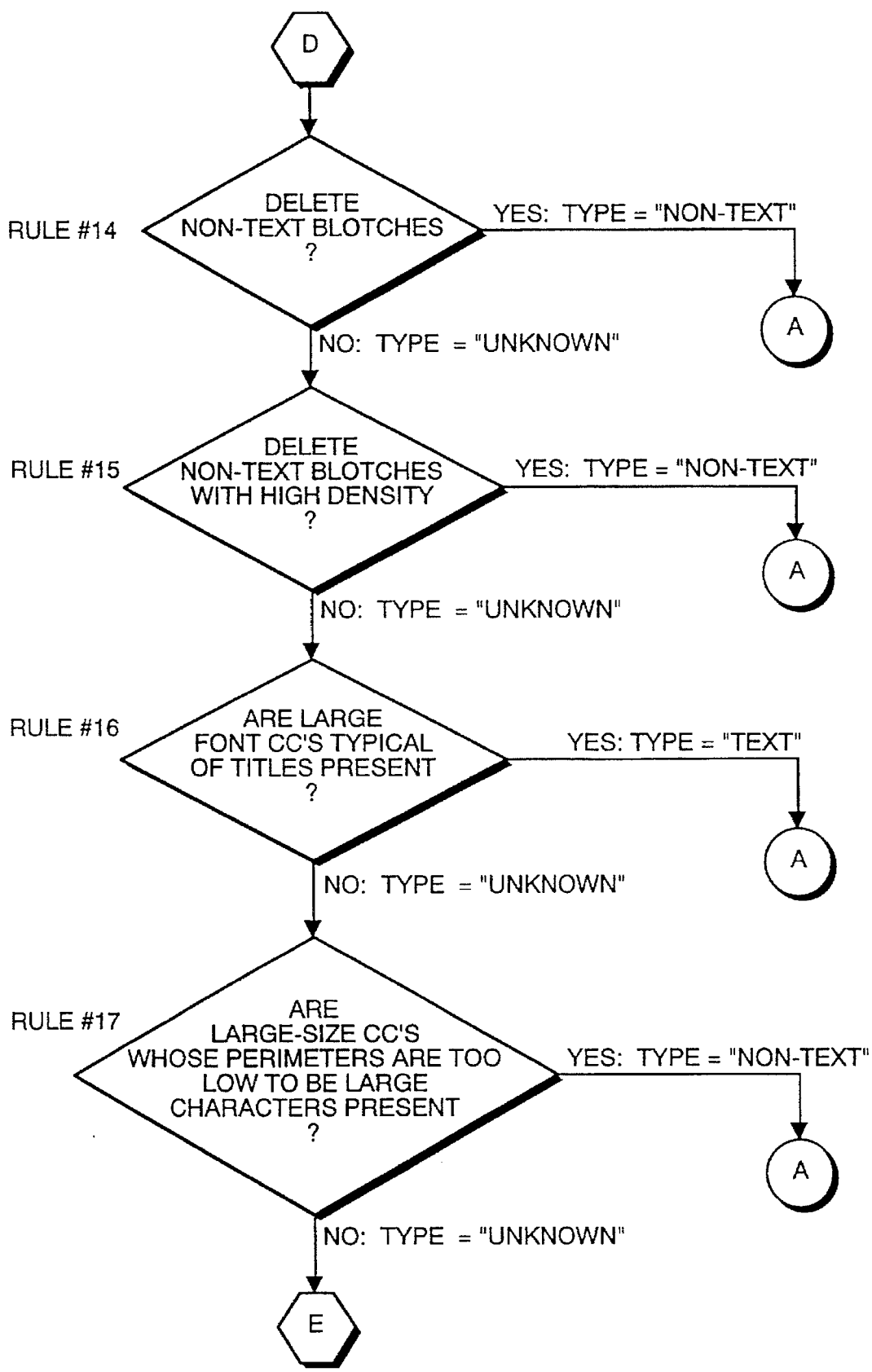
Figure 22E:
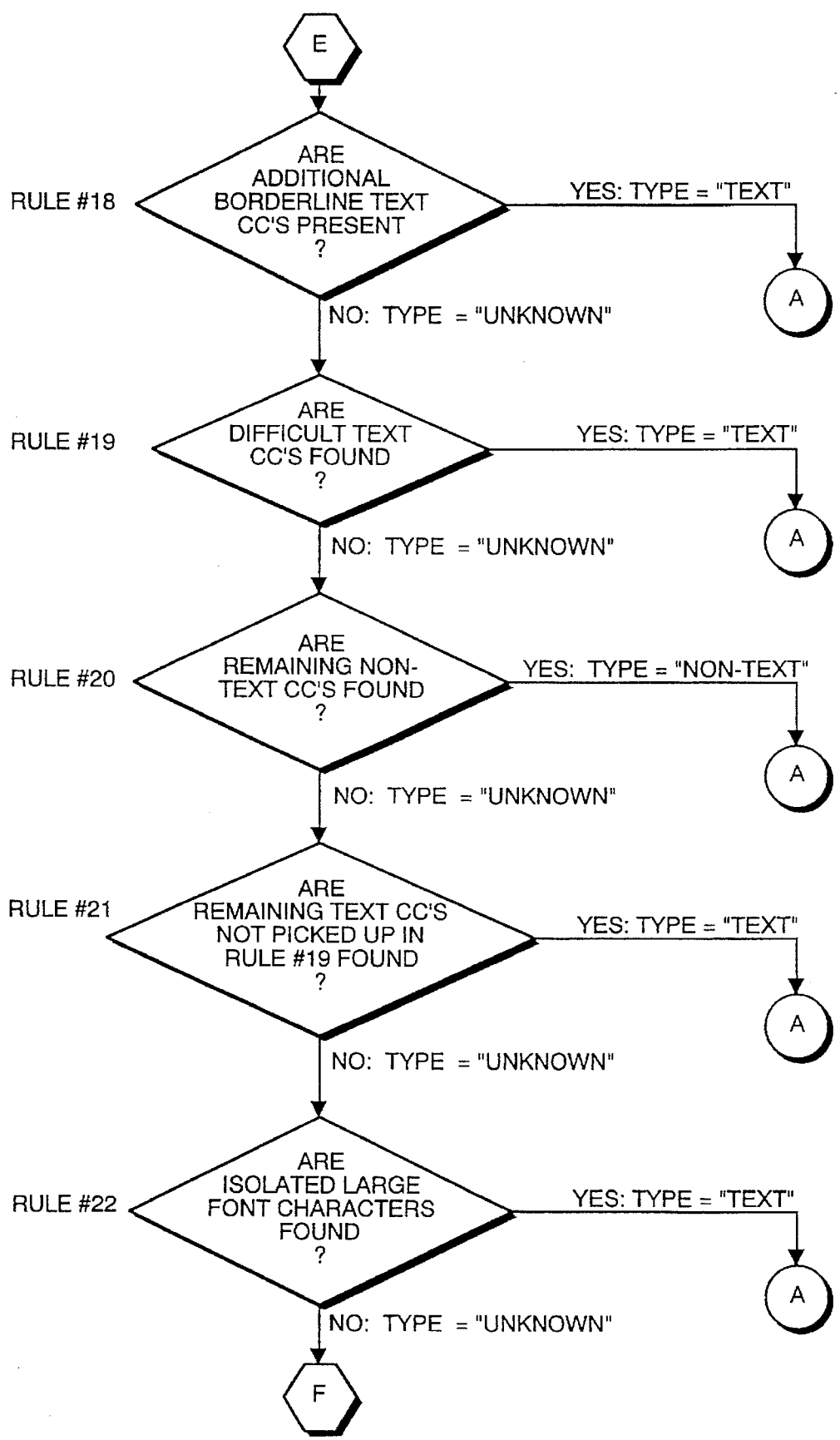
Figure 22F:
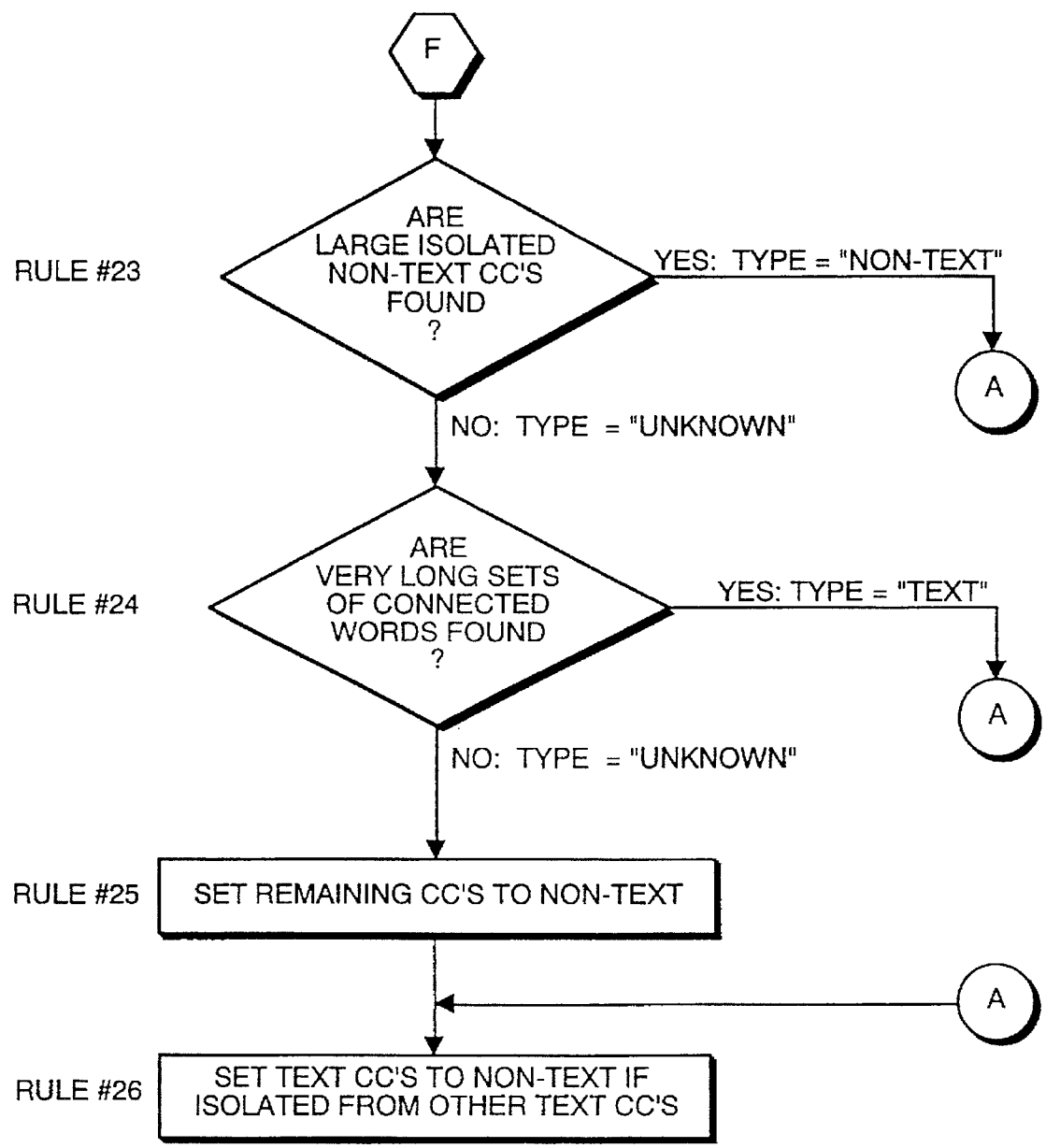

Although the eight-direction processing shown in FIG. 15 accurately identifies connected components, it is an expensive procedure in terms of CPU processor time and memory storage requirements since the entire image must ordinarily be present in memory at one time. Connected component processing described below in section 2.6.2 in connection with FIGS. 20 and 21 is a more efficient technique for obtaining connected components, and is therefore preferred in this step S1403.

In step S1404, physical image attributes are derived for each connected component. Thus, as shown in FIG. 16, for each connected component, image attributes such as aspect ratio, pixel count, density, perimeter, perimeter/width ratio, and (perimeter)$^2$/area ratio are all derived. In addition, a "type" attribute is also associated with each connected component. Initially, the type attribute is set to "unknown" but ultimately the type for each connected component will be set to "text" or "non-text" in accordance with further processing. It should be observed that the physical image attributes that are derived in this step S1404 are the attributes which are used in ambiguity-resolution step S914 of FIG. 9(c).

In step S1405, the connected components are inspected to determine whether the image is oriented as a portrait or a landscape image. More particularly, since most images are scanned in portrait orientation, processing described here is arranged to handle only portrait-type orientation. Accordingly, if a landscape orientation is detected in step S1405, flow switches to step S1406 which rotates the image 90 degrees so as to obtain a portrait-orientation image. Flow then returns to step S1404 to re-derive attributes for each connected component.

Once a portrait orientation image has been obtained, flow advances to step S1407 in which, for each "unknown" type of connected component, plural sets of rules are successively applied to the connected component so as to determine whether the connected component is a text or a non-text connected component. Connected component rules are described in more detail with reference to FIG. 22, but in general, the rules are applied to the attributes determined in step S1404 rather than to the connected component itself. In addition, the rules are preferably organized so that the first rules that are applied are simple rules that take little time to calculate and which separate, early on, easy-to-differentiate text from non-text connected components. Later rules are more complicated and take more time to apply, and separate hard-to-differentiate text from non-text connected components. However, because there are fewer "unknown" type of connected components at this later processing stage, these later rules are applied less frequently.

In step S1408, "text-type" connected components are analyzed to identify lines of text. Lines of text are identified so as to assist in page reconstruction step S915. In addition, by identifying lines of text, it is also possible to re-connect portions of characters which have been separated by connected component analysis. For example, as seen in FIG. 15, dot 86 over the "i" has been separated by connecter component analysis from the body 87 of the "i". By identifying text lines, as shown in step S1408, it is possible to reconnect those connected components to form a complete character "i" when characters are subsequently cut from text lines, as described below in step S1411.

In step S1409, if there are any touching lines of text, they are separated in step S1410. Then, in step S1411, individual characters are cut from the text line for further processing. Thus, for example, in connection with FIGS. 9(a) to 9(c), the individual characters cut from the text line are used as templates in step S906 so as to extract characters from a gray-scale image of the characters in step S907. In addition, in step S913, the characters cut in this step S1411 are themselves recognition-processed.

Figure 17:
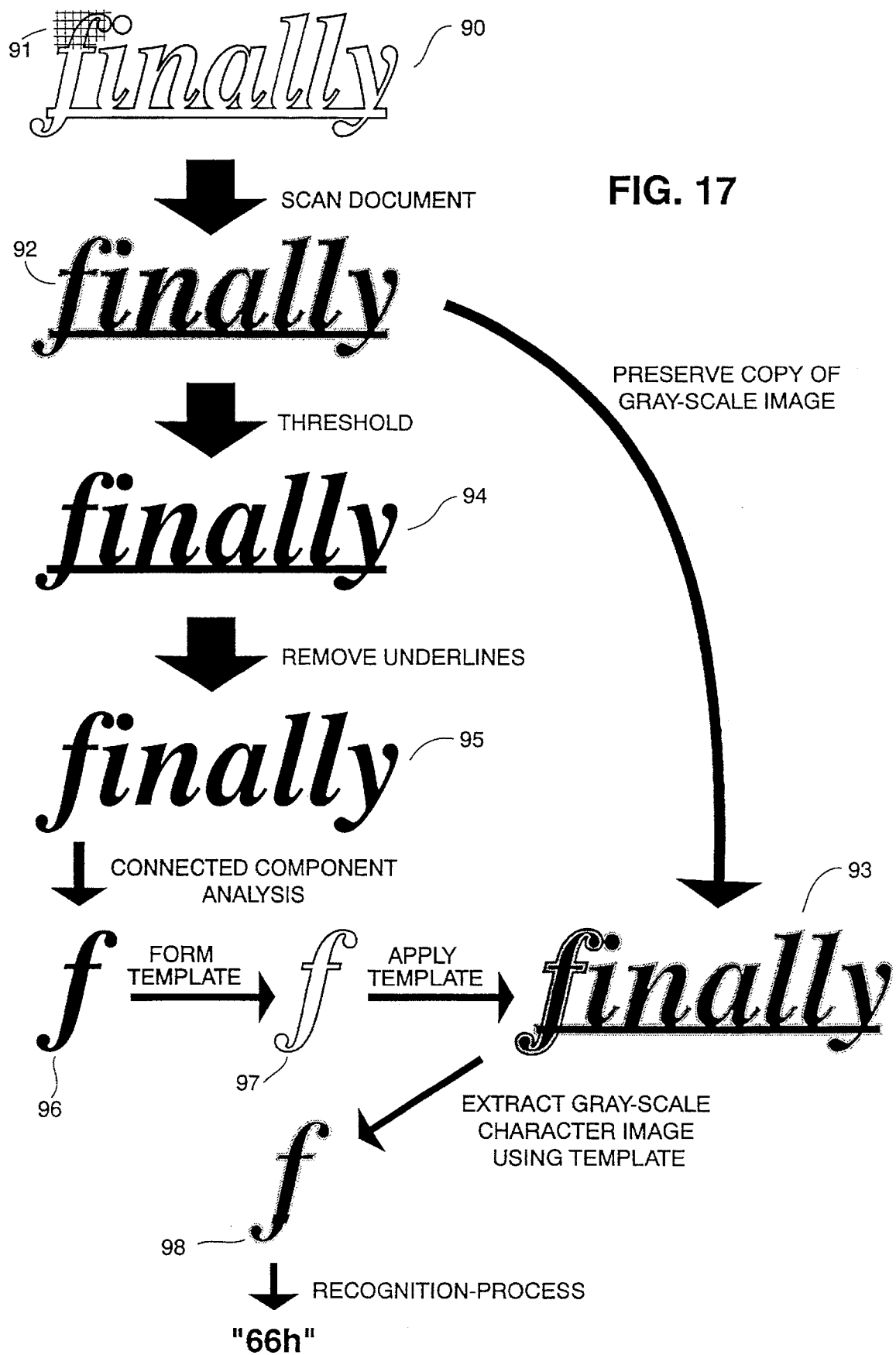
FIG. 17 is an example of how image processing affects the image of the word "finally".

FIG. 17 shows how the above processing affects the image of the word "finally". As shown in FIG. 17, and in accordance with step S901, document 90 which includes the printed word "finally" is scanned in at pixel resolution 91 so as to input a gray-scale image 92 of the word "finally". After de-skewing (step S902), a copy of the gray-scale image is preserved at 93, in accordance with step S903. Then, in accordance with step S904, the gray-scale image is thresholded so as to form a binary image 94.

The binary image is then segmentation-processed as described above in step S905. More particularly, with reference to FIG. 14, underlines are removed (step S1402) to yield image 95. Through connected component analysis (steps S1403 through S1412), characters 96 are cut from image 95. Then, templates 97 ere obtained (step S906) and the templates are applied to the copy 93 of the gray-scale image so as to extract gray-scale character images 98 (step S907). Note that the template may be enlarged by about two pixels so as to be certain that all relevant pixels from the gray-scale image are properly extracted. Note also that since the gray-scale image 93 is preserved with underlines intact, when gray-scale character images are subtracted they may include small residual underlining. These small residuals, however, do not interfere with recognition processing. Recognition processing is then performed on the extracted gray-scale character image so as to identify the extracted character image; in this example, for the character "f", recognition-processing yields the ASCII code "66hex" which is the hexadecimal value of the ASCII code for the character "f".

[2.6.1—Underline Removal]

Figure 18A:
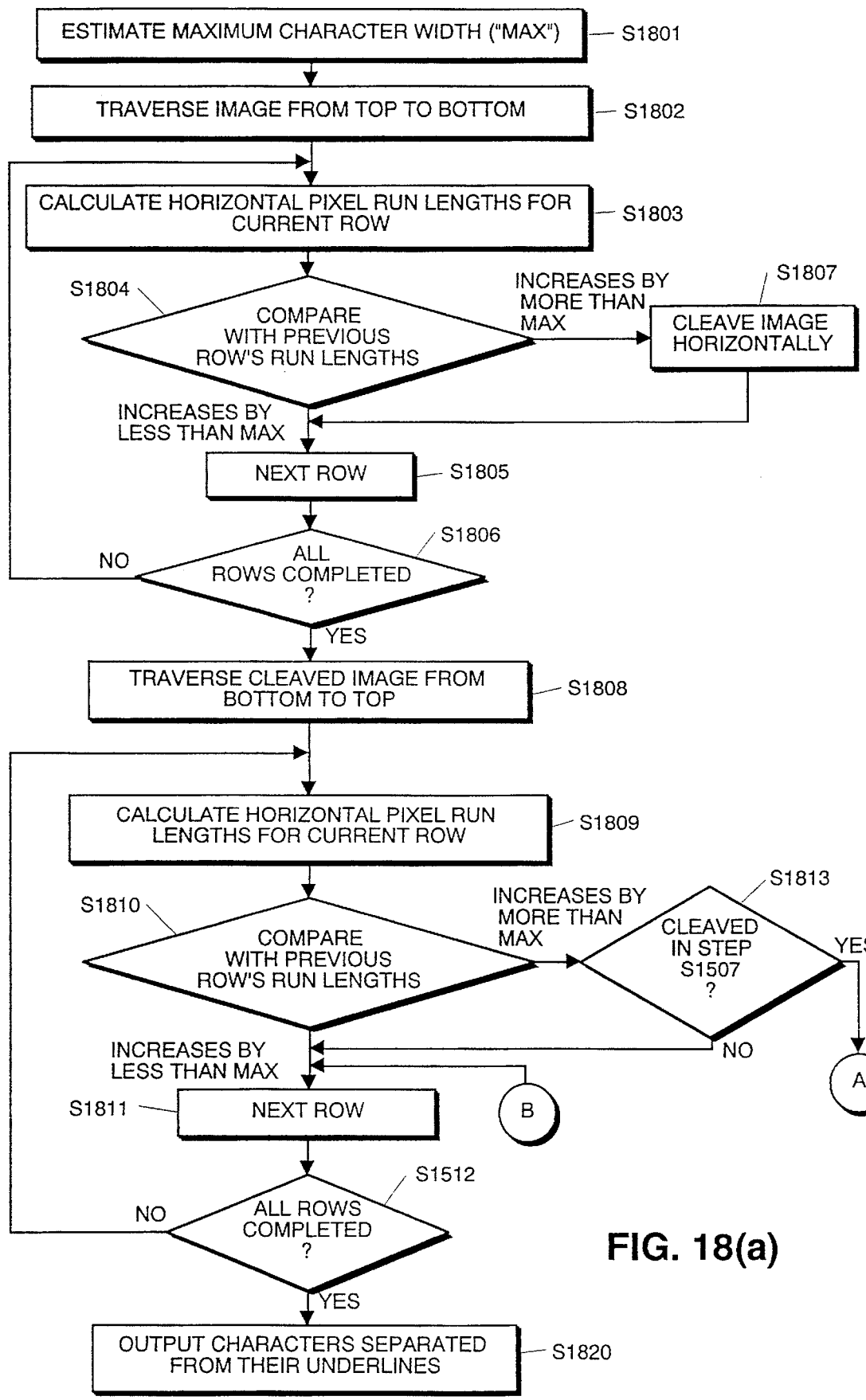
FIGS. 18(a) and 18(b), is a flow diagram for explaining underline removal.
Figure 18B:
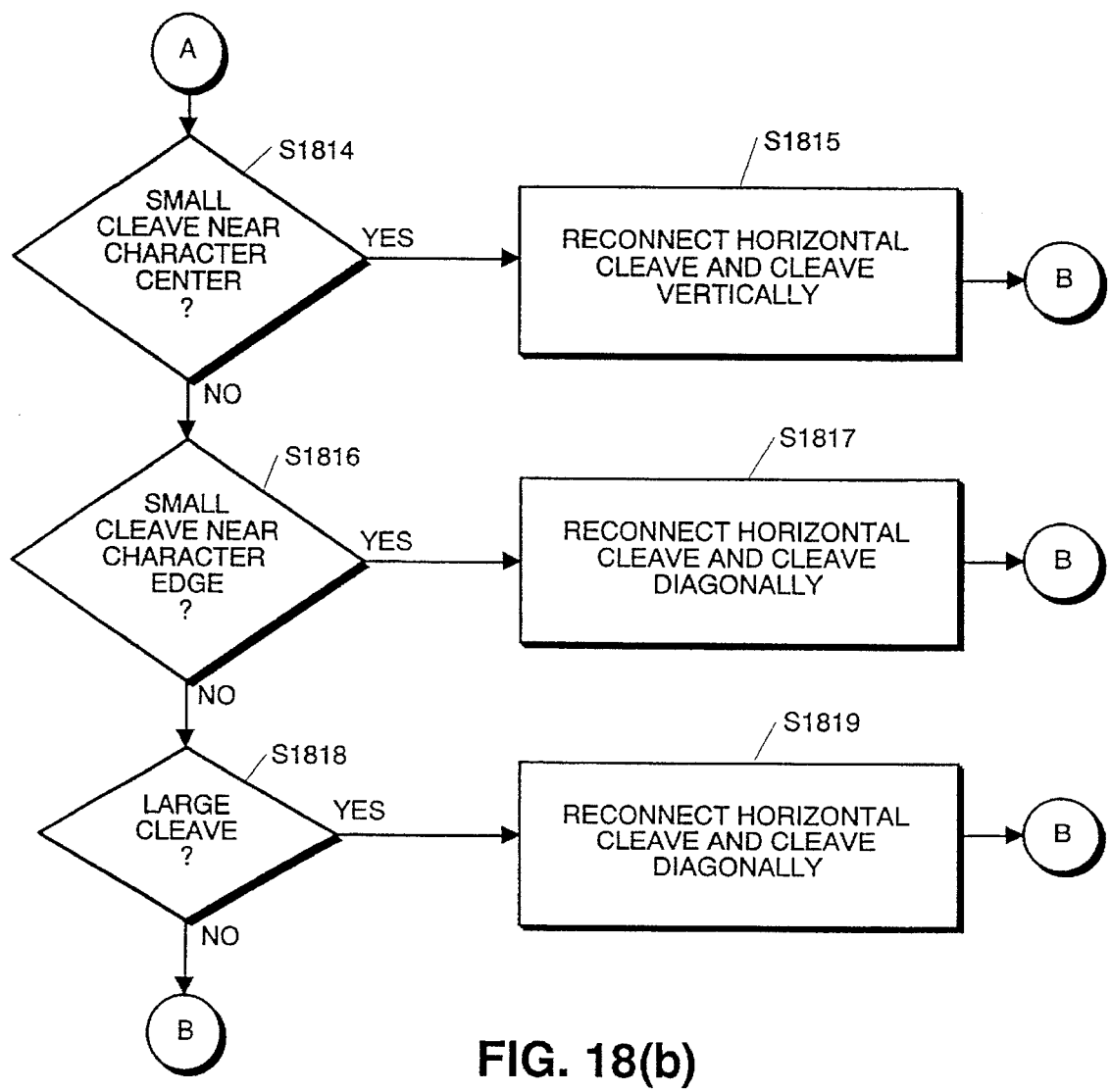
Figure 18:
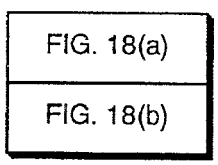
FIG. 18, which includes

FIG. 18 is a flow diagram for explaining how underlines are removed in accordance with step S1402. Underlines are not literally removed, but rather underlined characters are separated from the underline. Connected component analysis determines that the separated underline segments are "non-text" and ignores them in subsequent recognition processing.

Generally speaking, underlines are separated from underlined characters in an image by traversing the image row-by-row from top to bottom, calculating for each row run lengths of horizontal pixel runs in the image, comparing run lengths in each row to run lengths in a previous row, cleaving the image horizontally when it is determined that the run length of a current row has increased more than a predetermined value over the run length of a prior row, traversing the cleaved image row-by-row from bottom to top, calculating run lengths for current rows and comparing run lengths with prior rows, and cleaving the image vertically and reconnecting a prior horizontal cleave when it is determined that the run length of a current row has increased by more than the predetermined value over a prior row in the same area as where there has been a prior adjacent horizontal cleave in the image. In addition, by detecting where a prior horizontal cleave has been made, that is, whether the cleave has been made near the center of a character or near the edge of the character, the second cleaving operation need not be done vertically, but rather can be done diagonally so as to preserve the shape of certain characters such as a "j" or a "g".

More particularly, as shown at step S1801, the maximum character width "MAX" of characters in the document image is first estimated. An accurate estimation of the maximum character width is not needed for proper operation of the underline removal technique shown in FIG. 18, and only a rough estimate of the maximum character width is needed. Accordingly, the maximum character width may be set to an arbitrary fixed value, such as MAX=50 pixels, or it can be set to approximately three times an estimated average character width. In this embodiment, an estimated average character width is calculated as approximately image resolution divided by 16 and the maximum character width MAX is set to three times that value. Thus, for an image resolution of 400 dpi, MAX=3×400/16=75 pixels.

Figure 19A:
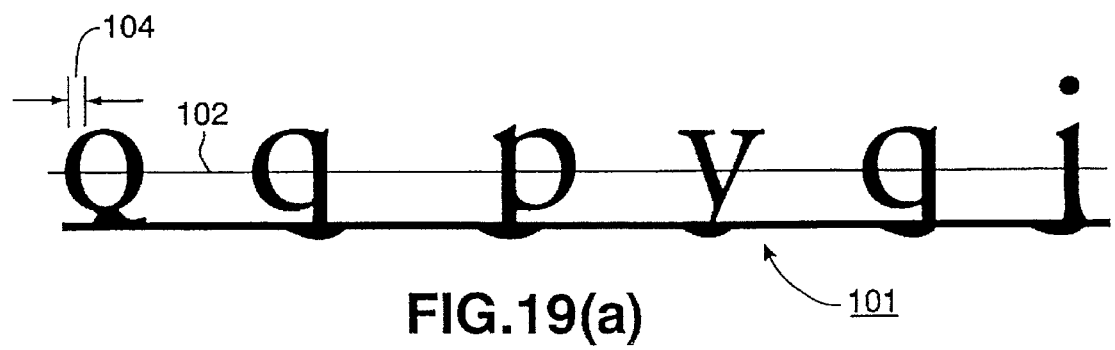
FIGS. 19(a) through 19(e) are views showing sequential stages of underline removal and how those stages affect an image of underlined characters.

In step S1802, the document image is traversed row-by-row from top to bottom. Then, in step S1803, run lengths of horizontal pixel runs are calculated. More particularly, as shown in FIG. 19(a) an arbitrary document image 101 is comprised of pixels making the character string "Ogpygj". For an arbitrary row 102 of pixels in the image, the horizontal run length of each horizontal run of pixels is calculated. Thus, as shown at 104, the horizontal run length of pixels which comprise the left most edge of the character "q" is calculated. Similar run lengths are calculated for each horizontal run of pixels in row 102.

Figure 19B:
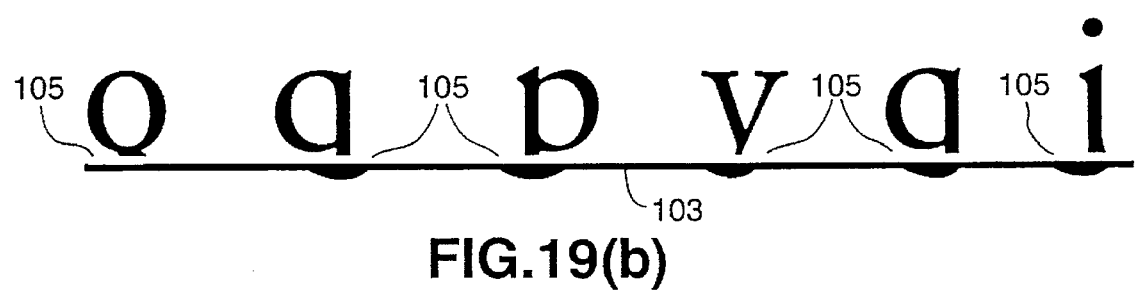
Figure 19C:
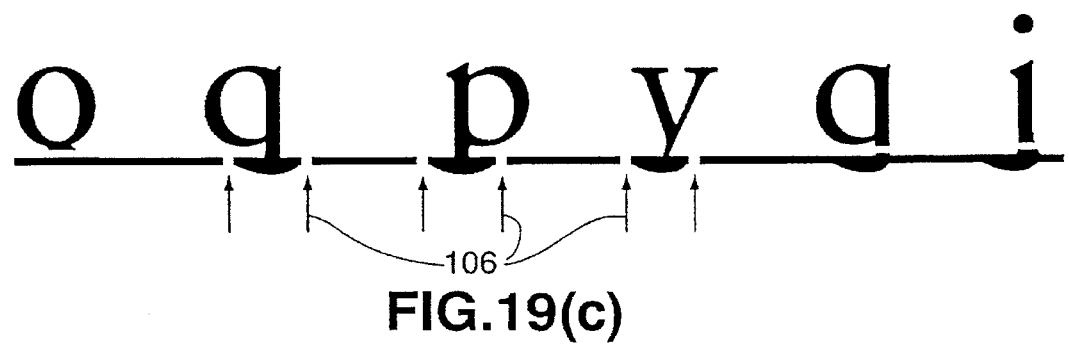

In step S1804, horizontal run lengths in the current row are compared with horizontal run lengths in the previous row. If the horizontal run length in the current row does not increase by more than MAX over the horizontal rum lengths in the previous row, then no special processing steps are taken and the next row of the document image is selected for processing (step S1805) and processing continues (step S1806) until all rows have been traversed from top to bottom. On the other hand, if the calculation in step S1804 indicates that the run lengths in the current row have increased by more than MAX compared to run lengths in the prior row, then the image is cleaved horizontally at that row. FIG. 19(b) illustrates this process.

More particularly, as shown in FIG. 19(b), processing has proceeded to a row at which it is determined that the presence of underline 103 makes the horizontal run length for the current row increase by more than MAX over the horizontal run lengths of the previous row. Accordingly, all pixels in that row are cleaved horizontally as shown at 105. Processing then continues with the next and subsequent rows (steps S1805 and S1806) until all rows have been traversed from top to bottom.

Flow then advances to step S1808 in which the cleaved image is traversed row-by-row from bottom to top. In step S1809, run lengths of horizontal pixel runs in the current row are calculated, and in step S1810, the run lengths in the current row are compared with the run lengths in the previous row. As before, if the run length of the current row does not increase by more than the run length in the previous row, then no special processing takes place and the next row is selected for processing until all rows in the cleaved image have been traversed from bottom to top.

On the other hand, if in step S1810 it is determined that the run length of the current row has increased by more than MAX over the run length of the previous row, then flow advances to step S1813 which determines whether there has been a prior horizontal cleave (from step S1807) in an adjacent area. If step S1813 determines that there has not been a prior horizontal cleave, then as before, no special processing is carried out and flow returns to step S1811 until all rows in the image have been traversed from bottom to top.

On the other hand, if there has been a prior horizontal cleave in an adjacent area, then the horizontal cleave is reconnected (or closed) and replaced with a pair of vertical or diagonal cleaves as shown in steps S1814 through S1819. More particularly, if in step S1814 it is determined that there has been a small-sized horizontal cleave near the center of a character, such as characters "q", "p" and "y" in FIG. 19(c), then flow advances to step S1815 in which the horizontal cleave is reconnected and a pair of vertical cleaves are inserted. As specifically shown in FIG. 19(c), since a prior horizontal cleave has occurred near the center of characters "q", "p" and "y", the horizontal cleave is closed and replaced with a pair of vertical cleaves as illustrated at 106.

Figure 19D:
Figure 19E:

In step S1816, if there has been a small horizontal cleave near a character edge, then flow advances to step S1817 in which the horizontal cleave is reconnected and replaced with a pair of diagonal cleaves. More particularly, as shown in FIG. 19(d), because horizontal cleaves have been detected near the character edge for characters "g" and "j", the horizontal cleave is closed and replaced by pairs of diagonal cleaves 108.

In step S1818, if it is determined that there has been a large horizontal cleave, then flow advances to step S1819 in which the horizontal cleave is reconnected and pairs of diagonal cleaves inserted at wider spacing than were inserted in step S1817. As specifically shown in FIG. 19(e), since a large horizontal cleave was detected for character "Q", the horizontal cleave is closed and replaced by a pair of diagonal cleaves 109.

[2.6.2 Connected Component Analysis]

FIG. 20 is a flow diagram illustrating a preferred technique for obtaining connected components (step S1403). Particularly, the connected component analysis technique described above in section 2.6 was expensive in terms of CPU processing times and memory storage requirements because it was necessary for a CPU to compare individual pixel bits in image data many times and it was also necessary for the entire image to be present in memory at the same time. The technique described here in FIG. 20 only requires two rows of the image to be present in memory at any one time, and also does not require the CPU to access individual pixel bits and image data many times but rather allows the CPU to access pixel data only once, to obtain horizontal pixel segments. Thereafter, the CPU works simply with the location of the horizontal pixel segments.

Briefly, according to the technique described in connection with FIG. 20, a method for obtaining connected components in pixel image data includes opening a list of connected components which initially contains no connected components, traversing the image row by row, preferably from bottom to top so as to output connected components in proper sequence, identifying all horizontal pixel segments in a current row of the image data, and comparing horizontal segments in the current row to horizontal segments in a previous row to determine whether any or all of four different cases exist: a first case in which the current row's segment is adjacent an open area in the previous row, a second case in which the current row's horizontal segment is adjacent a horizontal segment in a previous row, a third case in which the current row's segment bridges at least two connected components in the list of connected components, and a fourth case in which the previous row's horizontal segment is adjacent an open area in the current row. If the first case exists, then a new connected component is started in the list of connected components. If the second case exists, then the trace of the existed connected component of the horizontal segment is updated. If the third case exists, then the two connected components bridged by the horizontal segment are merged. Finally, if the fourth case exists, then the trace of the connected component in the list of connected components is closed out. After all rows in the image have been traversed, the list of connected components is output for further processing.

In more detail, as shown in step S2001, a computerized list of connected components is opened. The list is initialized to contain no connected components, but ultimately the list will contain all connected components in the image.

In step S2002, the image is traversed row by row, preferably from the bottom of the image to the top. This ordering is preferred so that the connected components in the list of connected components are ordered in proper sequential order.

In step S2003, all horizontal pixel segments in the current row of the image are identified. More particularly, as shown in FIG. 21 for an arbitrary image 120 of the word "UNION", for row 121 there are no horizontal pixel segments. On the other hand, for row 122, there are eight horizontal pixel segments identified at areas 122a, b, c, d, e, f, g and h. Each of those eight horizontal pixel segments is identified in step S2003.

Flow then advances to step S2004 which determines whether the horizontal pixel segments identified in step S2003 are adjacent to horizontal segments in the previous row of the image. If the current row's horizontal segment is not adjacent to a horizontal segment in the previous row, then a new horizontal segment has been identified and flow advances to step S2005 in which a new connected component is started in the list of connected components. Thus, for example, a new connected component is started for each of the eight horizontal segments 122a, b, c, d, e, f, g and h in FIG. 21.

On the other hand, if step S2004 determines that the current row's horizontal segment is adjacent to a horizontal segment in a previous row, then in step S2006 the trace for the existing connected component which corresponds to the horizontal segment is simply updated. More particularly, referring again to FIG. 21, for row 123, each of horizontal segments 123a through 123l is adjacent to a horizontal segment in a previous row. Accordingly, the trace for the connected component corresponding to those horizontal segments is simply updated. In this regard, it should be noted that horizontal segments 123c and 123d are both contained in the same connected component since both horizontal line segments started with a single line segment, namely horizontal pixel segment 122c. Likewise, horizontal pixel segments 123h and 123i both started from the horizontal pixel segment (122f) and they also are both contained in the same connected component.

Step S2007 determines whether a horizontal pixel segment bridges two or more connected components in the list of connected components. If the horizontal pixel segment bridges two or more connected components, then the traces for those connected components are merged (step S2008).

More particularly, as shown for row 124 in FIG. 21, horizontal pixel segment 124a bridges the two connected components that were started for horizontal segments 122a and 122b. Accordingly, those two connected components are merged. Similarly, horizontal segment 124c bridges the connected components that were started for horizontal segments 122c and 122d. Accordingly, those two connected components are merged. It should be noted that horizontal pixel segment 124e does not bridge two different connected components since only a single connected component was started at 122f.

Step 1709 determines whether a horizontal pixel segment in a previous row is adjacent to an open segment in the current rob. If the previous row's horizontal segment is now adjacent to an open area, then the connected component has been completed and the corresponding connected component is closed out (step S2010).

In any event, flow taken advances to step S2011 in which the next row in the image is processed until all rows in the image have been complete (step S2012). Once the entire image has been processed, the list of connected components is closed out and the list is output (step S2013) for calculation of connected component attributes (see step S1404).

[2.6.3—Rules for Distinguishing Text from Non-Text]

FIG. 22 is a flow diagram illustrating the plural sets of rules that are applied to connected component attributes to determine whether the connected component is a text or a non-text element. The rules are scale-invariant meaning that they do not depend for proper operation upon pre-knowledge of font size or other size information or the document being analyzed.

The rules are arranged so that those rules which are quick and which make easy-to-distinguish determinations between text and non-text connected components are applied first, while those that are more difficult and make hard-to-distinguish determinations between text and non-text connected components are applied last. Because the rules are only applied to "unknown" type of connected components, however, the latter rules are applied only infrequently since text and non-text determinations will already have been made by the earlier-applied rules.

In step S2201, the average height of connected components is determined so as to permit calculation of scale-invariant parameters for comparison to the connected component attributes. Then, in step S2202, the parameters are calculated based on the average connected component height. Some parameters are inherently scale-invariant and need not be calculated based or average connected component height. For example, since aspect ratio is the ratio of height to width, it already is scale invariant. Other parameters, however, such as minimum height, are not scale invariant and therefore are determined in step S2202.

Plural sets of rules are then applied to each connected component whose type remains "unknown" as detailed in the remainder of FIG. 22. Thus, in accordance with rule number 1, the height, aspect ratio, density, (perimeter)$^2$/area ratio, and perimeter/width ratio are all inspected to determine if the connected component has the approximate height, aspect ratio, density, and parameter of a text connected component. If it does, then additional tests are made on the height, aspect ratio, and density of the connected component to determine whether it is text or non-text, and the type of the connected component is classified accordingly.

If rule number 1 did not apply and the connected component remains "unknown", then in rule number 2 the number of pixels, the perimeter, the aspect ratio, and the height are inspected to determine if the connected component is small and thinner than a ".". If it is, then the connected component is set to "non-text".

If rule number 2 did not apply and the connected component remains "unknown", then in rule number 3, the height, aspect ratio, and density of the connected component are inspected to determine if the connected component is a slash ("/"). If it is, then the connected component is set to "text".

If rule number 3 did not apply and the connected component remains "unknown", then in rule number 4, the aspect ratio, height, and density of the connected component are examined to determine if the connected component is a single small, thin character like a "1", "l", etc If it is, then the connected component is set to "text".

If rule number 4 did not apply and the connected component remains "unknown"then in rule number 5, the aspect ratio, height, density, and (perimeter)$^2$/area ratio of the connected component are examined to determine if the connected component is a single small, short character like "—", "-", "~", each part of "=" or "%". If it is, then the connected component is set to "text".

If rule number 5 did not apply and the connected component remains "unknown", then in rule number 6, the aspect ratio, height, and density are examined to determine if the connected component is a small character like ".", ",", and each part of ":" or ";". If it is, the connected component type is set to "text".

If rule number 6 did not apply and the connected component remains "unknown", then in rule number 7, the aspect ratio, height, and density of the connected component are examined to determine if the connected component is a single character with a small height and density like "<", ">", "^", "u", or a "v". If it is, then the connected component type is set to "text".

If rule number 7 did not apply and the connected component remains "unknown", then in rule number 8, the height, aspect ratio, density, (perimeter)$^2$/area ratio and perimeter/width ratio of the connected component are examined to determine whether the connected component is wide and short like several connected characters in a row. If it is, then if the perimeter/width ratio is low or the density is high, like a line, then the type of connected component is set to non-text; if the perimeter per width is high and the density is low, then the connected component is set to text.

If rule number 8 did not apply and the connected component remains "unknown", then in rule number 9, the aspect ratio and density of the connected component are examined to determine if the connected component is a tall or vertical line stroke like "l". If it is, then the connected component type is set to "non-text".

If rule number 9 did not apply and the connected component remains "unknown", then in rule number 10, the aspect ratio and density of the connected component are examined to determine if the connected component is a long horizontal line stroke. If it is, then the connected component type is set to "non-text".

If rule number 10 did not apply and the connected component remains "unknown", then in rule number 11, the height of the connected component is examined to determine whether the connected component is a tall non-text region that was not picked up in the rule number 9. If it is, then the connected component type is set to "non-text".

If rule 11 did not apply and the connected component remains "unknown", then in rule number 12, the height and density of the connected component are examined to determine if the connected component is a borderline text component not already picked up. If it is, then the connected component type is set to "text".

If rule number 12 die not apply and the connected component remains "unknown", then in rule number 13 the aspect ratio, height, density, (perimeter)$^2$/area ratio and perimeter/width ratio of the connected component are examined to determine if the connected component is a series of connected letters for short words such as "an", "the", "was", and the like which were not already picked up by rule number 8. If it is, then the connected component is set to "text".

If rule number 13 did not apply and the connected component remains "unknown", then in rule number 14 the aspect ratio and density of the connected component are examined to determine if the connected component is a non-text blotch. If it is, then the connected component is set to "non-text".

If rule number 14 did not apply and the connected component remains "unknown", then in rule number 15 the density of the connected component is examined to determine if the connected component is a non-text blotch with very high density, for example, detailed graphics, or a non-text blotch with very low density, for example, frames surrounding text such as are found in tables. If it is, the connected component is set to "non-text".

If rule number 15 did not apply and the connected component remains "unknown", then in rule number 16 the height, density, aspect ratio, (perimeter)$^2$/area ratio and perimeter/width ratio of the connected component are examined to determine if the connected component is a larger-font word typically found in titles and headings. If it is, then the connected component is set to "text".

If rule number 16 did not apply and the connected component remains "unknown", then in rule number 17 the height, density, aspect ratio, (perimeter) $_2$/area ratio and perimeter/width ratio of the connected component are examined to determine if the connected component is a non-text element that is similar to a larger-font word but which has a lower perimeter and is therefore non-text. If it is, then the connected component is set to "nontext".

If rule number 17 die not apply and the connected component remains "unknown", then in rule number 18 the height and density of the connected component are examined to determine if the connected component is a borderline text block which is not picked up in rule number 12. If it is, then the connected component is set to "text".

If rule number 18 did not apply and the connected component remains "unknown", then in rule number 19 the (perimeter)$^2$/area ratio, perimeter/width ratio and the density of the connected component are examined to determine if the connected component is a remaining difficult-to-determine text connected component. If it is, then the connected component is set to "text".

If rule number 19 did not apply and the connected component remains "unknown", then in rule number 20 (perimeter)$^2$/area ratio, perimeter/width ratio and density of the connected component are examined to determine if the connected component is a difficult-to-determine non-text element not picked up in rule number 18. If it is, then the connected component is set to "non-text".

If rule number 20 did not apply and the connected component remains "unknown", then in rule number 21 the density, aspect ratio and (perimeter)$^2$/area ratio of the connected component are examined to find remaining difficult-to-determine text-type connected components not picked up by rule number 19. If the connected component is one of the remaining difficult-to-determine text-type connected component, then the connected component is set to "text".

If rule number 21 did not apply and the connected component remains "unknown", then in rule number 22 the height, perimeter/width ratio, aspect ratio and (perimeter)$^2$/area ratio of the connected component are all examined to determine if the connected component is an isolated larger-font character such as an initial large-font letter in a magazine article. If it is, then the connected component is set to "text".

If rule number 22 did not apply and the connected component remains "unknown", then in rule number 23 the height, perimeter/width ratio and aspect ratio of the connected component are examined to determine if the connected component is an isolated non-text element similar to larger-font characters like the font in a heading or a title but nevertheless non-text. If it is, then the connected component is set to "non-text".

If rule number 23 did not apply and the connected component remains "unknown", then in rule number 24 the (perimeter)$^2$/area ratio and perimeter/width ratio of the connected component are examined to determine if the connected component is a very long word or set of connected words. At this point in the filtering rules, this filter very rarely finds anything but is nevertheless included to insure that such series of connected words are properly designated as "text". If the criteria of the rule are met, then the connected component is set to "text".

If rule number 24 did not apply and the connected component remains "unknown", then in rule number 25 remaining connected components are set to "non-text".

In rule number 26, each text connected components is examined and, if the text connected component is isolated from other text connected components, then the connected component is set to "non-text". This insures that isolated markings on the page, such as may be created by stray pencil marks or water marks, are not erroneously interpreted as text.

What is claimed is:

1. An imaging computer system comprising:
    imaging computer means which is connectable to a scanner and to a local area network (LAN), said imaging computer means for performing selectable tasks including scanning tasks for scanning in documents to create document images and image-processing tasks for performing image processing on the document images; and
    a plurality of programmable function keys on said imaging computer means, each of said function keys being programmable over the LAN to perform selected ones of the scanning tasks and the image-processing tasks of said imaging computer means, and each of said function keys being manipulable by an operator so as to cause said imaging computer means to chain together the selected scanning tasks and the selected image-processing tasks and perform the selected scanning tasks and the selected image-processing tasks.

2. A system according to claim 1, wherein said plurality of programmable function keys are partitioned into at least two groups, wherein the first group is restricted to programming over the LAN only by a network administrator for the LAN and wherein the second group is unrestrictedly programmable over the LAN by any LAN user.

3. A system according to claim 1, wherein said image-processing tasks include tasks to retrieve document images from the LAN, to recognition-process character images in the document images, and to store text files to the LAN.

4. A system according to claim 1, further comprising display means for displaying an image of said plural function keys, wherein in response to operator selection of a displayed image of one of said plural function keys, said display means displays the function performed by that key.

5. A system according to claim 4, wherein, with the image of each of said plural function keys, said display means displays an identification of that key.

6. A system according to claim 5, wherein said identification comprises an identification of the user that programmed the key.

7. An imaging computer system according to claim 1, further comprising the scanner for providing scanned image data to the imaging computer system, wherein the imaging computer system uses the scanner and the scanned image data to perform the selected scanning tasks and the selected image-processing tasks.

8. Image processing method for an imaging computer system connected to a local area network (LAN) comprising the steps of:

programming over the LAN one of plural programmable function keys on said imaging computer system, the programmable function keys being programmed to cause the imaging computer system to perform selectable ones of plural tasks which include inputting tasks for inputting document images and image-processing tasks for performing image processing on the document images; and in response to manipulation of a function key, chaining together the selected inputting tasks and the selected image-processing tasks and performing the selected inputting tasks and the selected image-processing tasks programmed by that key.

9. A method according to claim 7, wherein the programmable function keys are divided into at least two groups, and wherein programmable function keys in the first group are restricted to programming over the LAN by a network administrator for said LAN, whereas programmable function keys in the second group are unrestricted and can be programmed over the LAN by any network user.

10. A method according to claim 9, wherein said image-processing tasks include tasks to retrieve document images from the LAN, to recognition-process character images in the document images, and to store text files to the LAN.

11. A method according to claim 8, further comprising the steps of:

displaying an image of said plural programmable function keys on said personal imaging computer system; and in response to selection of a displayed image of one of said displayed function keys, displaying functions performed by that key.

12. A method according to claim 11, wherein in said displaying step, with the image of each of said plural function keys, an identification of that key is displayed.

13. A method according to claim 12, wherein said identification comprises an identification of the user that programmed the key.

14. An image processing method according to claim 8, wherein said inputting tasks comprise scanning a document to obtain image data representing the document.

* * * * *

UNITED STATES PATENT AND TRADEMARK OFFICE
CERTIFICATE OF CORRECTION

PATENT NO. : 5,650,799

DATED : July 22, 1997

INVENTOR(S) : Roger D. Melen

It is certified that error appears in the above-identified patent and that said Letters Patent is hereby corrected as shown below:

```
        Column 15, line 14, change "through" to --Hough--.

Column 19, line 32, change "ere"  to --are--.

Column 20, line 39, change "rum" to --run--.

Column 23, line 14, change "rob." to --row.--; and
                  line 18, change "taken" to --then--.

Column 25, line 3, change "die" to --did--;
                  line 34, change "(perimeter) ₂/area" to
--(perimeter)²/area--; and
                  line 40, change "die" to --did--.

Column 28, line 1, change "claim 7" to --claim
  8--.
```

Signed and Sealed this

Third Day of March, 1998

Attest:

BRUCE LEHMAN

*Attesting Officer*     *Commissioner of Patents and Trademarks*